(12) United States Patent
Ogawa

(10) Patent No.: US 7,708,820 B2
(45) Date of Patent: May 4, 2010

(54) BLACK INK COMPOSITION, INK SET CONTAINING THE SAME, AND INK JET RECORDING METHOD

(75) Inventor: Manabu Ogawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 545 days.

(21) Appl. No.: 11/632,654

(22) PCT Filed: Jul. 12, 2005

(86) PCT No.: PCT/JP2005/013227

§ 371 (c)(1),
(2), (4) Date: Jan. 16, 2007

(87) PCT Pub. No.: WO2006/006728

PCT Pub. Date: Jan. 19, 2006

(65) Prior Publication Data

US 2007/0240608 A1    Oct. 18, 2007

(30) Foreign Application Priority Data

Jul. 13, 2004  (JP) .............................. 2004-206462

(51) Int. Cl.
*C09D 11/02* (2006.01)
*B41J 2/01* (2006.01)
(52) U.S. Cl. .................. 106/31.52; 106/31.43; 347/100
(58) Field of Classification Search .............. 106/31.52, 106/31.43; 347/100
See application file for complete search history.

(56) References Cited

U.S. PATENT DOCUMENTS

| | | | |
|---|---|---|---|
| 5,109,236 A | 4/1992 | Watanabe et al. | |
| 5,256,194 A | 10/1993 | Nishiwaki et al. | |
| 6,156,111 A * | 12/2000 | Schwarz .................. | 106/31.43 |
| 7,125,444 B2 * | 10/2006 | Taguchi et al. ............ | 106/31.46 |
| 7,279,033 B2 * | 10/2007 | Yabuki et al. ............. | 106/31.52 |
| 7,291,213 B2 * | 11/2007 | Ogawa et al. ............. | 106/31.43 |
| 7,435,292 B2 * | 10/2008 | Hanmura et al. ......... | 106/31.48 |
| 7,503,966 B2 * | 3/2009 | Yabuki et al. ............. | 106/31.52 |
| 7,520,928 B2 * | 4/2009 | Ikeda et al. ............... | 106/31.52 |
| 7,527,684 B2 * | 5/2009 | Wachi ....................... | 106/31.52 |
| 2004/0003755 A1 | 1/2004 | Fukumoto et al. | |
| 2004/0187232 A1 | 9/2004 | Chino et al. | |
| 2007/0109376 A1* | 5/2007 | Tojo et al. ................. | 106/31.52 |
| 2007/0139499 A1* | 6/2007 | Yabuki et al. ............. | 106/31.52 |
| 2008/0043078 A1* | 2/2008 | Wachi ....................... | 106/31.52 |
| 2008/0043079 A1* | 2/2008 | Ikeda et al. ............... | 106/31.52 |

FOREIGN PATENT DOCUMENTS

| | | | |
|---|---|---|---|
| EP | 0569864 A1 | | 11/1993 |
| EP | 0909798 | * | 4/1999 |
| JP | 63-63766 A | | 3/1988 |
| JP | 8-100141 A | | 4/1996 |
| JP | 2000-327965 A | | 11/2000 |
| JP | 2001-106946 A | | 4/2001 |
| JP | 2002-139822 A | | 5/2002 |
| JP | 2003-50448 A | | 2/2003 |
| JP | 2003-286421 A | | 10/2003 |
| JP | 2004-91632 A | | 3/2004 |
| WO | 02/094943 A1 | | 11/2002 |
| WO | WO 2005/030886 A1 | | 4/2005 |
| WO | WO 2005/030887 A1 | | 4/2005 |

OTHER PUBLICATIONS

Abstract of WO 2005/121261, Dec. 2005.*
Abstract of WO 2006/006703, Jan. 2006.*
Abstract of WO 2005/030887, Apr. 2005.*
Structure of Direct Black 32 from STN Registry file, Nov. 1984.*
Extended European Search Report dated Sep. 4, 2008.

* cited by examiner

*Primary Examiner*—Helene Klemanski
(74) *Attorney, Agent, or Firm*—Sughrue Mion, PLLC

(57) ABSTRACT

A black ink composition is provided and contains at least two coloring materials, water and additives, wherein the coloring material on the short wave side of the two coloring materials is a water-soluble dye having 3 or more azo groups in one molecule and a naphthalene skeleton, and the additives are selected from the group consisting of a bronzing inhibitor and an ozone resisting improver.

12 Claims, No Drawings

BLACK INK COMPOSITION, INK SET CONTAINING THE SAME, AND INK JET RECORDING METHOD

TECHNICAL FIELD

The present invention relates to a black ink composition containing an azo dye having a specific structure and characteristics (preferably a black ink composition for forming an image (preferably an ink jet ink composition)), and a recording method using the black ink composition, in particular relates to a recording method suitable for ink jet recording.

BACKGROUND ART

The ink jet recording method has rapidly developed and is spreading even now for the reasons that the materials are inexpensive, high speed recording is possible, the noise in the time of recording is low, and color recording is easy.

The ink jet recording method includes a continuous system of continuously ejecting ink droplets, and an on-demand system of ejecting ink droplets according to image data signals, and the ejection system includes a system of ejecting ink droplets by the application of pressure with piezo elements, a system of ejecting ink droplets by generating foams in the ink by heat, a system of using ultrasonic waves, and a system of sucking and ejecting ink droplets by electrostatic force.

As the ink jet recording ink, aqueous ink, oil ink or solid (melting type) ink is used.

The colorants for use in these ink jet recording inks are required to have good solubility or dispersibility in a solvent, to be excellent in a color developing property, to show good hue, to be fast to light, heat and active gases in the environment (oxidizing gases, e.g., $NO_x$, ozone, etc., and $SO_x$, etc.), to be excellent in fastness to water and chemicals, to be good in fixing ability to image-receiving materials and to hardly blot, to be excellent in preservability as ink, to be non-toxic, to be highly pure, and to be available inexpensively. However, it is extremely difficult to find colorants that satisfy these requirements on a high level. In particular, colorants for black ink having good black tone, capable of high density printing, and fast to light, humidity and heat are strongly desired.

Disazo dyes or trisazo dyes have been used as coloring matters for black, but these dyes alone are insufficient for absorption of blue and green lights and good black tone cannot be obtained in many cases, so that dyes for color correction of absorbing blue and green lights are generally used in combination. As such dyes for color correction, the dyes as disclosed in JP-A-9-255906 and Japanese Patent 3178200 are proposed to contrive the adjusting ability of black tone, a color developing property, fastness, the preservation stability of ink, water tightness, and clogging of nozzles.

However, proposed dyes for color correction in the related art are too short in wavelength of absorption, and so they are wanting in the adjusting ability of black tone such that dyes must be added in quantities or other dyes for color correction are further necessary.

Dyes capable of absorbing blue and green lights generally known are inferior in fastness and the hue is largely changed by the exposure of an image to light, heat and active gases in the environment, and the fixing ability is also insufficient. As a result, a phenomenon that the contour part bleeds with the dyes in yellow inevitably occurs under high humidity condition, thus further improvement is necessary.

In consideration of these drawbacks, a black ink composition comprising a black dye having been blended with, as the dye for color correction, a triazine dye having an absorption maximum of the absorption spectrum in the visible region at the wavelength of 435 nm in an aqueous solvent is disclosed in JP-A-2002-332426.

However, general black dyes have an absorption maximum in the wavelengths of from 570 to 620 nm, so that, considering the relationship of complementary colors important for black tone adjustment, it is apparent that suitable black tone cannot be obtained even the dye for color correction is used (*Shikisai Kagaku Handbook* (*Handbook of Color Science*), the Second Edition, pp. 560-562, Publishing Association, The University of Tokyo (1998)).

On the other hand, particularly in the ink jet recording method, a problem of a bronzing phenomenon is known in the case where a recorded image having high optical density is formed, which is a phenomenon that the crystal of the coloring matter precipitates on the surface of the recording material with the progress of drying, and the recorded image reflects light and emits metallic luster.

The bronzing phenomenon is liable to occur by the reduction of water solubility of the dye and the introduction of a hydrogen-bonding group into the dye structure for the purpose of the improvement of light fastness and gas resistance (ozone resistance). Since light is reflected and scattered by the occurrence of the bronzing phenomenon, not only the optical density of an image lowers but also the hue of a recorded image is greatly different from the desired one and the transparency is lost, so that the compatibility of the inhibition of the bronzing phenomenon and the improvement of ozone resistance is desired.

As a method of improving the bronzing phenomenon, JP-A-6-25575 and JP-A-8-337745 disclose a method of using a urea derivative and a titanium compound, but the method is still for the improvement of the bronzing phenomenon and cannot achieve the compatibility of the inhibition of the bronzing phenomenon and the improvement of ozone resistance.

Further, as a method of improving gas resistance (ozone resistance), e.g., JP-A-2003-138185 discloses a method of the addition of a specific compound to improve gas resistance (ozone resistance), but the method is still insufficient for the improvement of gas resistance (ozone resistance).

DISCLOSURE OF THE INVENTION

An object of an illustrative, non-limiting embodiment of the invention is to provide a dye for color correction that makes it possible to realize printing with excellent black tone and high density without the addition of the dye in quantities or the addition of other dyes for color correction, and excellent in a color developing property, fixing ability and fastness. Another object of an illustrative, non-limiting embodiment of the invention is to provide an ink composition for printing using the dye for color correction. A further object of an illustrative, non-limiting embodiment of the invention is to provide a composition of aqueous ink for writing.

A still further object of an illustrative, non-limiting embodiment of the invention are to provide a black ink composition having good black tone, capable of high density recording free from the occurrence of the bronzing phenomenon, capable of forming an image having high fastness to light and ozone, and having sufficient moisture proof not causing bleeding even when preserved under high humidity conditions, and to provide a recording method using the black ink composition.

From the thorough examination on various dye compounds aiming at the dyes for color correction having good black tone adjusting ability, good color developing property and excellent fastness to light and ozone, the present inventors have found that a dye having a specific structure as shown below can solve the above problems. Further, from the eager examination by the present inventors, it has been found that the fastness of ink composition and the inhibition of the bronzing phenomenon are well reconciled by the use of a bronzing inhibitor and/or an ozone resisting improver in combination with the dye.

(1) A black ink composition comprising:

at least two coloring materials comprising a first coloring material having an absorption maximum at a shorter wavelength;

water; and an additive, wherein the first coloring material is a water-soluble dye comprising: 3 or more azo groups in one molecule thereof; and a naphthalene skeleton, and the additive is at least one of a bronzing inhibitor and an ozone resisting improver.

(2) The black ink composition as described in the above item (1), wherein the bronzing inhibitor is a colorless water-soluble planar compound having more than 10 delocalized π electrons in one molecule thereof.

(3) The black ink composition as described in the above item (2), wherein the colorless water-soluble planar compound is a compound having at least two aromatic rings.

(4) The black ink composition as described in the above item (1), wherein the bronzing inhibitor is at least one of an aromatic compound having a carboxyl group and a salt of the aromatic compound.

(5) The black ink composition as described in the above item (4), wherein the aromatic compound is a compound having a naphthalene skeleton.

(6) The black ink composition as described in any of the above items (1) to (5), wherein the ozone resisting improver is a guanidine compound.

(7) The black ink composition as described in the above item (6), wherein the guanidine compound is a compound represented by formula (1):

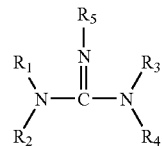

wherein $R_1$, $R_2$, $R_3$ and $R_4$ each independently represents a hydrogen atom, an alkyl group, an alkoxyl group, an aryl group, a heterocyclic group, or an amino group; $R_5$ represents a hydrogen atom, an alkyl group, an alkoxyl group, an aryl group, or a heterocyclic group; and the alkyl group, alkoxyl group, aryl group, heterocyclic group, and amino group each may be substituted.

(8) The black ink composition as described in any of the items (1) to (7), wherein the first coloring material has an absorption maximum at a wavelength of from 440 to 540 nm and a half-band width of from 90 to 200 nm in an aqueous solvent.

(9) The black ink composition as described in any of the above items (1) to (8), wherein the at least two coloring materials comprises a second coloring material having an absorption maximum at a longer wavelength than 550 nm.

(10) An ink set comprising a black ink composition as described in any of the above items (1) to (9).

(11) A recording method comprising using a black ink composition as described in any of the items (1) to (9), or an ink set as described in the above item (10).

(12) The recording method as described in the above (9), which is for ink jet recording.

According to an ink set using the black ink composition in the invention and an ink jet recording method in the invention, an image having good black tone, high printing density free of the bronzing phenomenon, and fast to light and active gases in the environment can be formed. Further, bleeding in an image during preservation under high humidity conditions can be broadly improved.

DETAILED DESCRIPTION OF THE INVENTION

Exemplary embodiments of a black ink composition according to the invention are described in detail below.

Black Ink Composition:

A black ink composition in the invention contains at least two coloring materials, water and an additive. The coloring materials and the additives to be contained in the black ink composition in the invention are described below.

Coloring Materials:

The black ink composition in the invention contains at least two coloring materials, and the coloring material on the short wave side of the two coloring materials (i.e., one coloring material having an absorption maximum at a shorter wavelength than that of the other coloring material) is a water-soluble dye having 3 or more azo groups in one molecule and a naphthalene skeleton. The dye is described in detail below (the dye is hereinafter referred to as "shorter wave dye S" for avoiding confusion).

Shorter wave dye S in the invention has 3 or more azo groups in one molecule. By this structure, a color developing property can be enhanced, and an image having good fixing ability can be formed since the plane of the coloring matter is widened. The number of the azo groups is preferably 3 or more, particularly preferably 4 or more, from the viewpoint of color developing property and fixing ability.

Further, due to the naphthalene skeleton of shorter wave dye S, an image having good fixing ability can be formed since the plane of the coloring matter is widened, similarly to the above.

The naphthalene skeleton means a structure containing a naphthalene ring.

Shorter wave dye S in the invention is preferably a dye having an absorption maximum in the range of from 440 to 540 nm in the absorption spectrum of the visible region in an aqueous solvent, and a half-band width in the range of from 90 to 200 nm, and capable of achieving broad absorption. The above aqueous solvent is a mixture comprising water as the main component containing a water-miscible organic solvent, if necessary.

Due to the absorption characteristics of shorter wave dye S, it can absorb wide range of lights from blue to green, which is liable to be insufficient with a disazo dye or a trisazo dye, so that shorter wave dye S has suitable absorption characteristics as a dye for color correction.

The absorption maximum of shorter wave dye S is preferably in the range of from 450 to 520 nm, particularly preferably from 460 to 500 nm.

The half-band width of shorter wave dye S is preferably in the range of from 100 to 180 nm, particularly preferably from 110 to 160 nm.

Further, shorter wave dye S in the invention preferably does not have a dissociable phenolic hydroxyl group that is present in general coloring matters. Due to such a structure, shorter wave dye S has preferred characteristics such that the tone change depending upon the image receiving material to be used is little, and the reactivity to oxidizing gases in the air such as ozone is low and excellent in gas resistance.

The dissociable phenolic hydroxyl group means a dissociable hydroxyl group substituted with an aryl group. The aryl group may be substituted with other substituent.

Shorter wave dye S is not particularly restricted so long as it has the physical properties as defined in the invention and capable of solving the above problems, and a polyazo dye represented by formula (2) can be exemplified as shorter wave dye S.

$$(D)_n\text{-}Y \quad (2)$$

In formula (2), D represents the residue of a coloring matter comprising a chromophore containing 1 to 3 azo groups conjugated to each other and 3 or 4 aromatic rings having 20 or more in total of π electrons, and n represents 1 or 2, and when n is 1, Y represents a hydrogen atom, and when n is 2, Y represents a divalent linking group. The aromatic rings in the chromophore may be heterocyclic rings or hydrocarbon rings, but preferably hydrocarbon rings. In the case where the aromatic rings in the chromophore form a condensed ring, the number of π electrons on the aromatic rings is counted as the number of π electrons of the condensed ring as a whole, for example a naphthalene ring comprises 10 π electrons. The examples of the divalent linking group represented by Y include an alkylene group, an arylene group, a heterocyclic residue, —CO—, —SO$_n$— (n is 0, 1 or 2), —NR— (R represents a hydrogen atom, an alkyl group or an aryl group), —O—, and divalent linking groups obtained by combining these linking groups, and these groups may further have a substituent, e.g., an alkyl group, an aryl group, an alkoxyl group, an amino group, an acyl group, an acylamino group, a halogen atom, a hydroxyl group, a carboxyl group, a sulfamoyl group, a carbamoyl group, a sulfonamido group, etc. As the examples of particularly preferred linking groups, —NH—CO—NH—, —NH—CS—NH—, and a group represented by formula (2-1) can be exemplified.

In the specification of the invention, an alkyl group means a straight chain, branched or cyclic (may be monocyclic or polycyclic, and in the case of polycyclic, the group may be a bridged type or a spiro type) alkyl group, or a monovalent saturated hydrocarbon group obtained by combining these groups and includes a cycloalkyl group and a cycloalkylalkyl group.

In the specification of the invention, an alkenyl group means a straight chain, branched or cyclic (may be monocyclic or polycyclic, and in the case of polycyclic, the group may be a bridged type or a spiro type) alkenyl group, or a monovalent unsaturated hydrocarbon group obtained by combining these groups containing one or more carbon-carbon double bond(s) exclusive of an aromatic group.

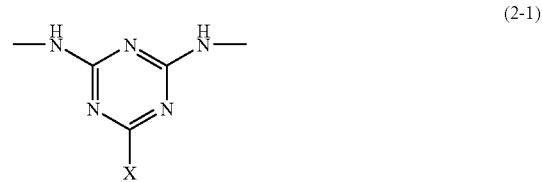

(2-1)

wherein X represents a hydroxyl group, a sulfo group, an alkoxyl group, an aryloxy group, an amino group (including an alkylamino group and an arylamino group), an alkyl- or arylsulfenyl group, and each group may further have a substituent.

As shorter wave dye S, e.g., commercially available C.I. Direct Red 84, C.I. Direct Brown 106 and C.I. Direct Brown 202 are useful. Of these dyes, C.I. Direct Red 84 is especially preferred for its excellent color developing property, fastness, fixing ability, and capable of being used for tone adjustment of many black dyes.

The examples of shorter wave dye S preferably used in the invention are shown below in the structure of free acid, but these compounds may of course be used in the form of arbitrary salts.

As preferred counter cations, alkali metals (e.g., lithium, sodium, potassium), ammonium, and organic cations (e.g., pyridinium, tetramethylammonium, guanidinium) can be exemplified.

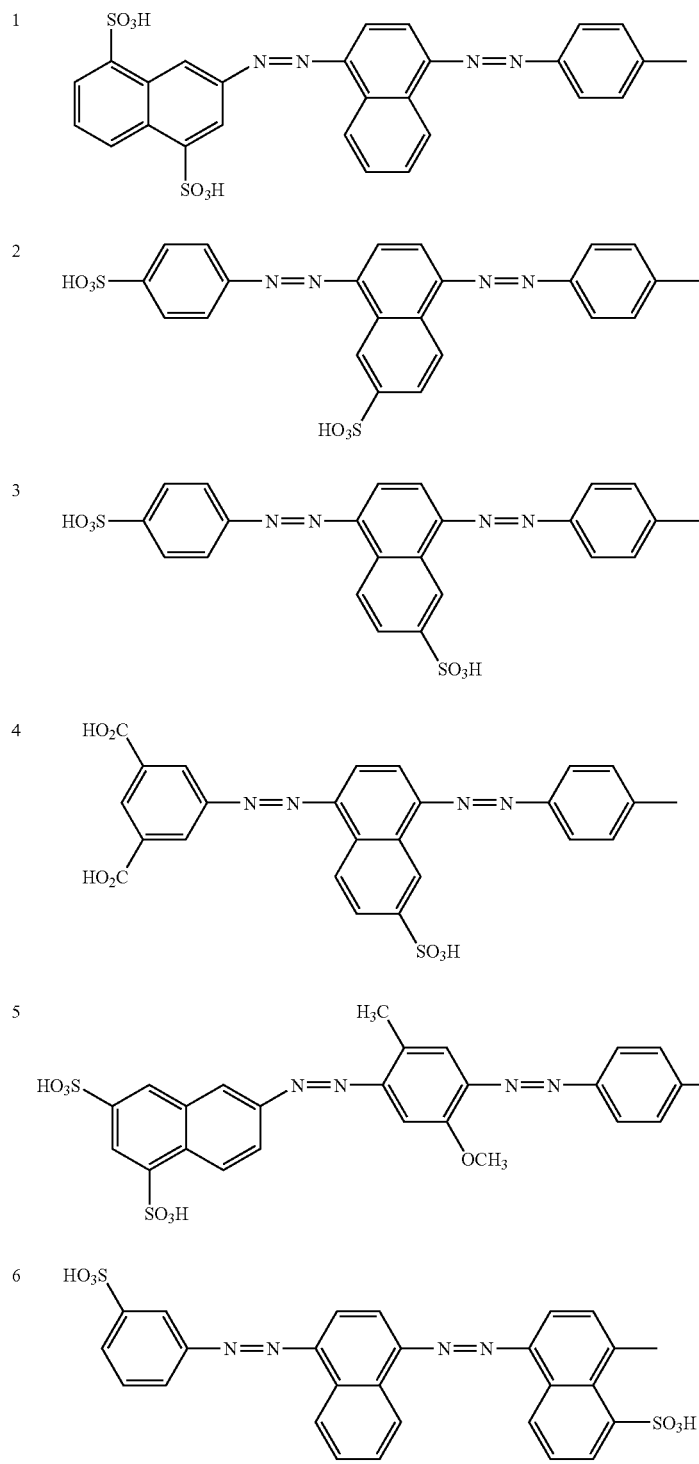

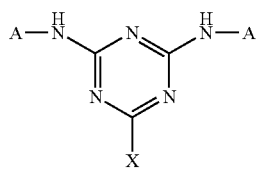
| | A | X |
|---|---|---|
| 7 | 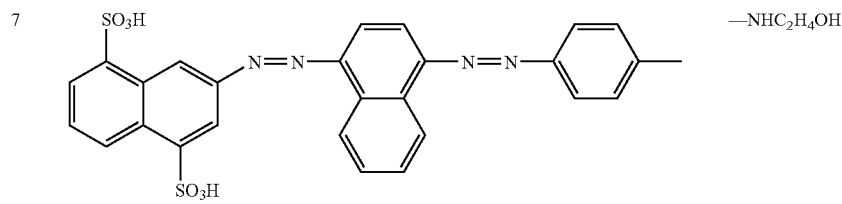 | —NHC₂H₄OH |
| 8 | 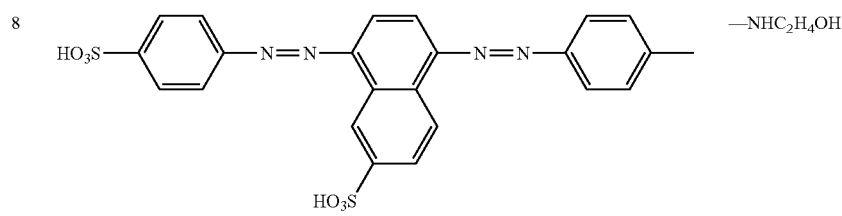 | —NHC₂H₄OH |
| 9 | 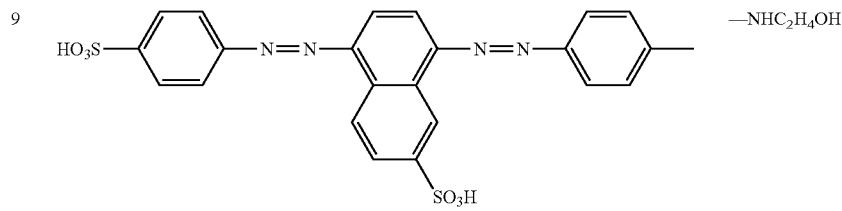 | —NHC₂H₄OH |
| 10 | 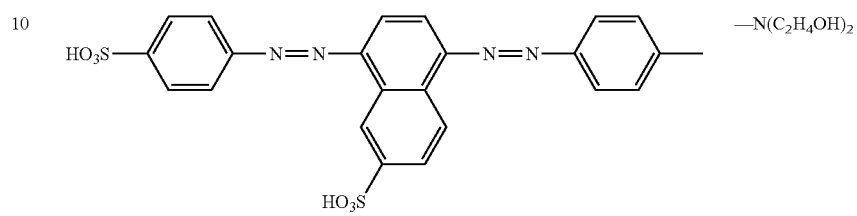 | —N(C₂H₄OH)₂ |
| 11 | 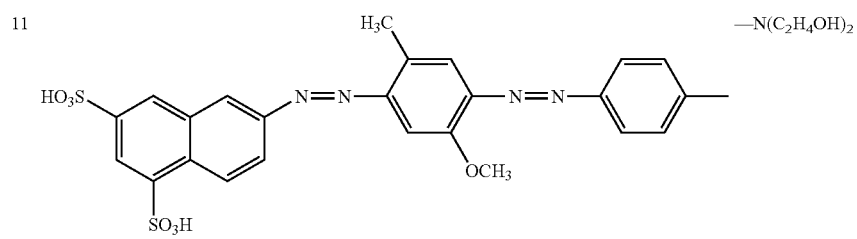 | —N(C₂H₄OH)₂ |
| 12 | 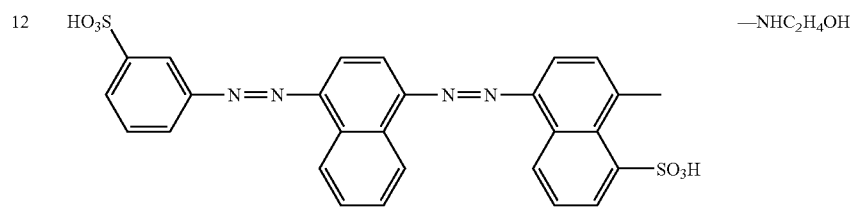 | —NHC₂H₄OH |

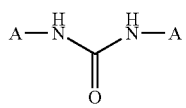

A

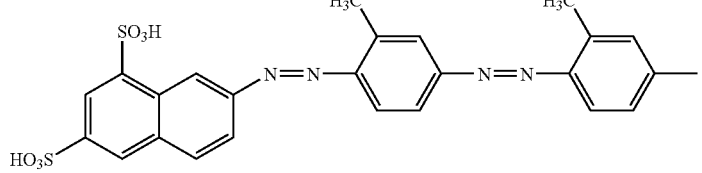

13

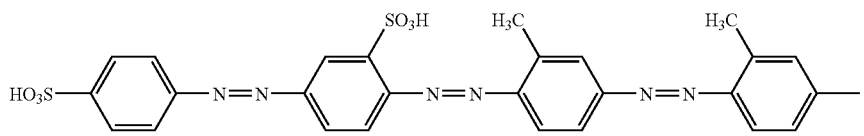

14

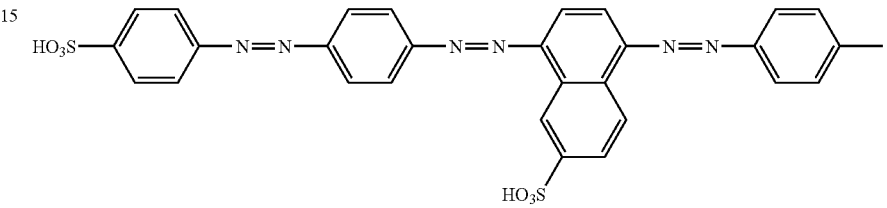

15

Of these compounds, C.I. Direct Red 84 (Na salt of the above Exemplified Compound 2) and C.I. Direct Brown 106 (Na salt of the above Exemplified Compound 14) are preferred for being commercially available, and C.I. Direct Red 84 is especially preferred for its excellent color developing property, fastness, fixing ability, and capable of being used for tone adjustment of many black dyes.

The above shorter wave dye S other than the commercially available products can also be easily synthesized from commercially available starting materials according to the synthesizing routes of C.I. Direct Red 84 or C.I. Direct Brown 106 described in *Color Index*, Vol. 4, published by The Society of Dyers and Colourists.

The black ink composition in the invention contains shorter wave dye S in ink in an amount of from 0.1 to 4 weight %, preferably from 0.5 to 3.0 weight %, and particularly preferably from 1.0 to 2.5 weight %, but the content may be arbitrarily changed, if necessary.

It is preferred that the black ink composition in the invention contains a water-soluble black dye having 3 or more azo groups conjugated to each other in one molecule, preferably a water-soluble black dye having an absorption maximum wavelength on the side longer than 550 nm (the dye is hereinafter referred to as "longer wave dye L"). Good black tone can be obtained by using longer wave dye L in combination with shorter wave dye S.

In longer wave dye L, to have a hydroxyl group on the conjugation position of the azo groups and the number of the heterocyclic group in the chromophore being 1 or less contribute to the assurance of high color developing property, absorption characteristics of broad half-band width suitable for black tone, and the stability of ink, although the reason is not clear. Conjugation position means the substitution position having the relationship of conjugation to the azo groups, and the hydroxyl group is preferably substituted on the ortho- or para-position of the substitution positions of the azo groups.

In general, there are cases where dyes having a hydroxyl group on the conjugation position of azo groups are inferior in the fastness to light and active gases in the air according to the kinds of image-receiving materials and the preservation conditions of printed matters, so that longer wave dye L having an associating property capable of physically restraining the reaction is further preferred.

Whether a dye is in the state of association or not can be relatively easily judged by measuring the absorption spectrum in the visible region of the dye with respect to dye concentrations, judging whether the dye has an associating property by examining the absorption maximum wavelength, the molar extinction coefficient and the change of the wave form, and comparing the physical properties of the solution and the absorption spectrum of the dye on the image-receiving material.

Specifically, a preferred dye is a dye that satisfies the relationship of $\epsilon1/\epsilon2>1.2$ between the molar extinction coefficient ($\epsilon1$) at the maximum wavelength of the absorption in the visible region of 0.1 mmol/liter of the aqueous solution of a dye measured with a cell having an optical path length of 1 cm and the molar extinction coefficient ($\epsilon_2$) of 0.2 mmol/liter of the aqueous solution of the dye measured with a liquid crystal cell having an optical path length of 5 μm, as defined in JP-A-2004-307831 (US 2004/187735 A1).

It is preferred for longer wave dye L to have the maximum of absorption spectrum (absorption maximum) in an aqueous solvent of from 550 to 700 nm, and the half-band width of 100 nm or more, preferably from 120 to 500 nm, more preferably from 120 to 350 nm.

Of longer wave dye L having the absorption maximum wavelength on the side longer than 550 nm preferably used in the invention, the dyes represented by formulae are particularly preferred.

In formulae, the dyes are shown in the structure of free acid, but these compounds can of course be used in the form of arbitrary salts in practical use.

dyes represented by formula (3), the dyes in which X represents an amino group or a hydroxyl group are preferred, and the dyes in which X represents a hydroxyl group are particularly preferred. From the viewpoint of fastness, the dyes substituted with an electron withdrawing group or the dyes in which any of $A_1$, $A_2$ and B represents a heterocyclic group are preferred.

The examples of preferred electron withdrawing groups include a nitro group, a cyano group, a halogen atom, a sulfamoyl group, a carbamoyl group and an ester group.

As the examples of preferred heterocyclic groups, pyrazole, thiazole, isothiazole, oxazole, isooxazole, and pyridine that may have a condensed ring are exemplified.

The dye represented by formula (3) is particularly preferably represented by formula (6).

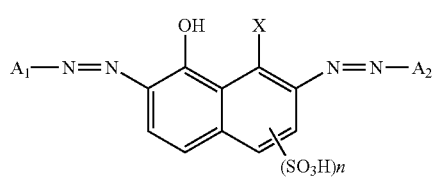

(3)

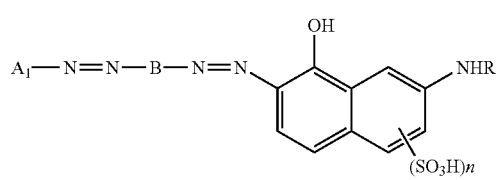

(4)

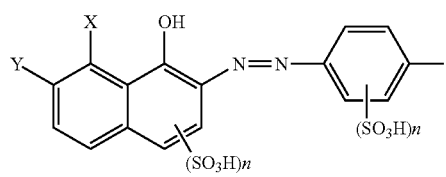

(5)

In the above formulae (3) to (5), when a plurality of substituents represented by the same character are present in one and the same molecule, they may be the same or different. X represents an amino group, a hydroxyl group or a hydrogen atom; Y represents a hydrogen atom or an amino group; R represents a hydrogen atom, an alkyl group, an aralkyl group, an alkenyl group, an aryl group, a heterocyclic group, an acyl group or a sulfonyl group. These groups may have a substituent, e.g., a halogen atom, an ionic hydrophilic group (e.g., a sulfo group, a carboxyl group, etc.), an alkoxyl group, a hydroxyl group, an acylamino group, an acyl group, a carbamoyl group, and a sulfamoyl group are exemplified as representative substituents. n represents an integer of from 0 to 3; the sulfo group may substitute on arbitrary position of a benzene ring or a naphthalene ring; $A_1$ and $A_2$ each represents a monovalent aromatic group or a heterocyclic group; B represents a divalent aromatic group or a heterocyclic group; $A_1$ and $A_2$ may further be substituted with an azo group; $A_1$, $A_2$ and B may further have a substituent. The number of heterocyclic group contained in the chromophore of a dye is preferably 1 or less. A part of the dyes represented by these formulae may be dissociated to form chelate dyes coordinated with a transition metal.

Of the dyes represented by formula (3), (4) or (5), the dyes represented by formula (3) or (4) are preferred, and the dyes represented by formula (3) are particularly preferred. Of the

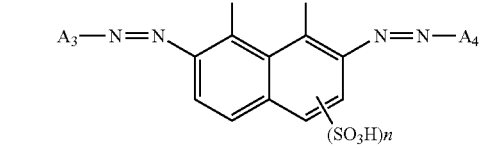

(6)

wherein $A_3$ and $A_4$ each represents a heterocyclic group or an aryl group represented by formula (7); and n represents an integer of from 0 to 3.

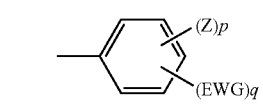

(7)

wherein EWG (Electron Withdrawing Group) represents an electron withdrawing group selected from the group consisting of a nitro group, a cyano group, an azo group, a sulfamoyl group, a carbamoyl group, and an ester group, preferably a nitro group and an azo group; Z represents a substituent selected from an alkyl group, an alkoxyl group, a sulfo group, a carboxyl group, an amino group and an acylamino group. The substituents represented by EWG and Z may further have a substituent. p represents an integer of from 0 to 4; and q represents an integer of from 0 to 3, preferably 1 or 2.

The examples of preferred longer wave dye L are shown below in the structure of free acid, but these compounds may of course be used in the form of arbitrary salts.

As preferred counter cations, alkali metals (e.g., lithium, sodium, potassium), ammonium, and organic cations (e.g., pyridinium, tetramethylammonium, guanidinium) can be exemplified.

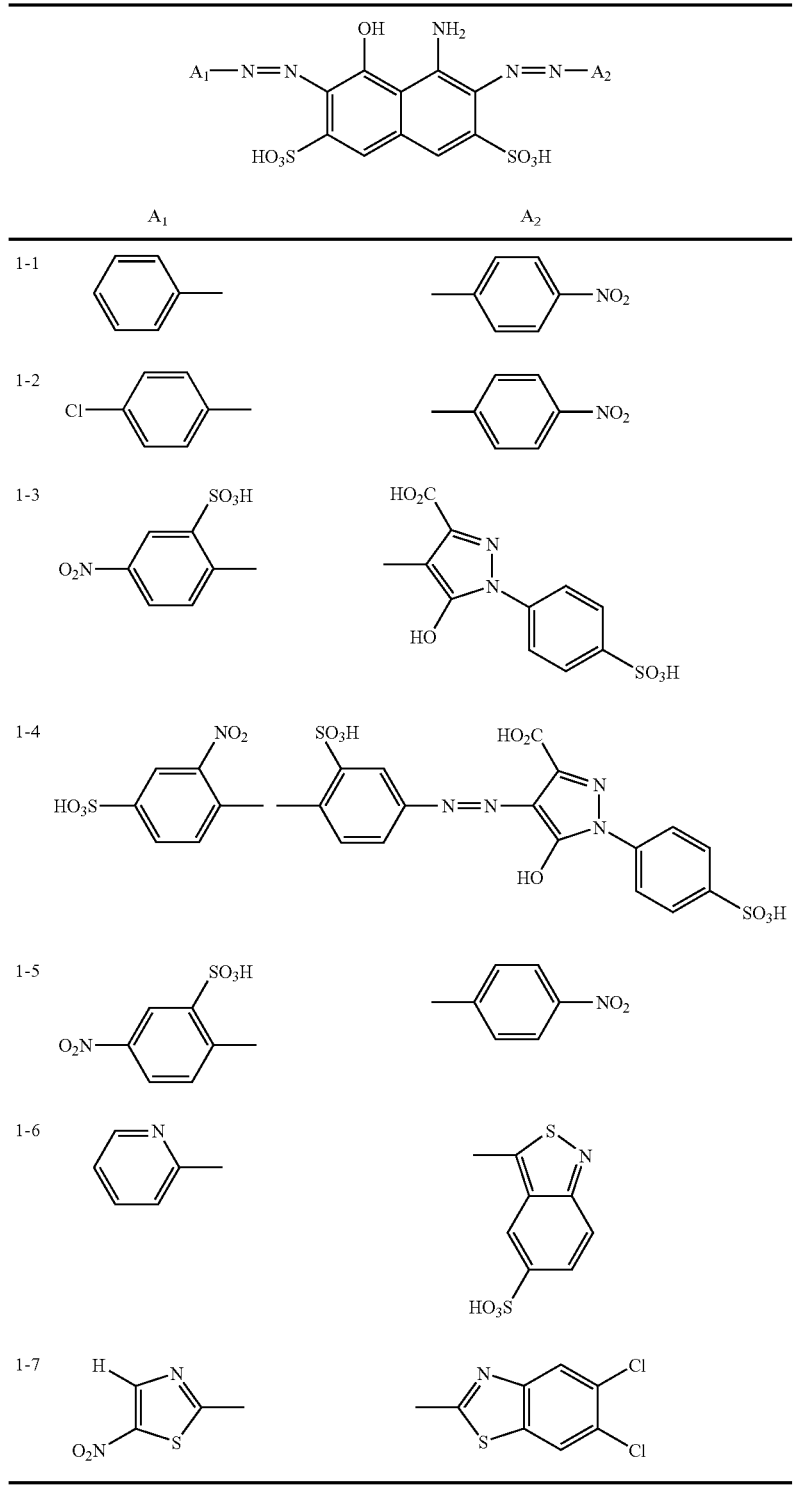

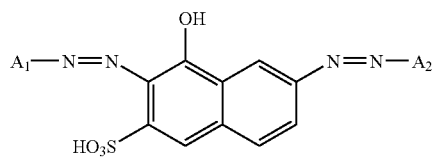
| | $A_1$ | $A_2$ |
|---|---|---|
| 1-8 | 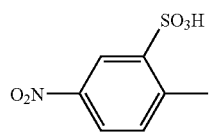 | 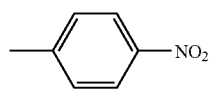 |
| 1-9 | 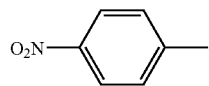 | 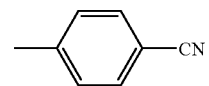 |
| 1-10 | 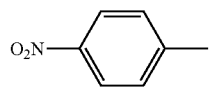 | 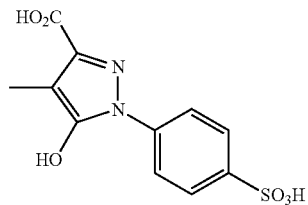 |
| 1-11 | 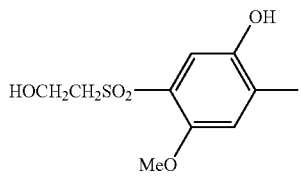 | 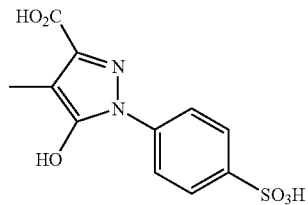 |
| 1-12 | 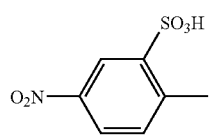 | 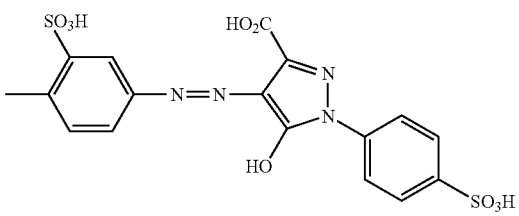 |
| 1-13 | 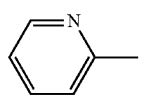 | 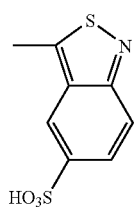 |

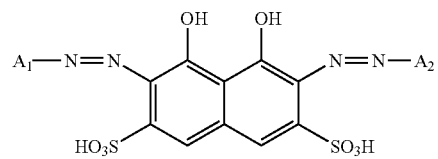
| | $A_1$ | $A_2$ |
|---|---|---|
| 1-14 | 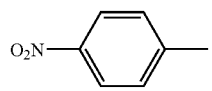 | 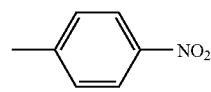 |
| 1-15 | 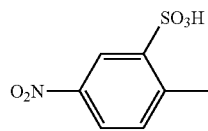 | 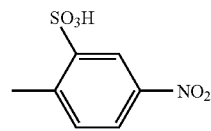 |
| 1-16 | 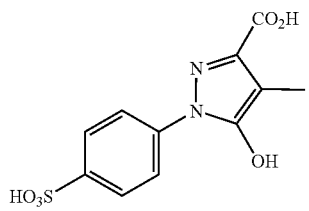 | 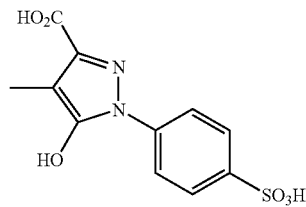 |
| 1-17 | 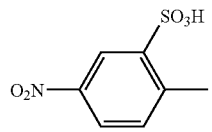 | 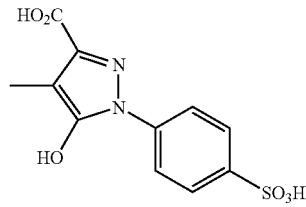 |
| 1-18 | 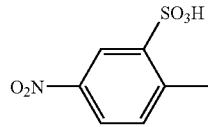 | 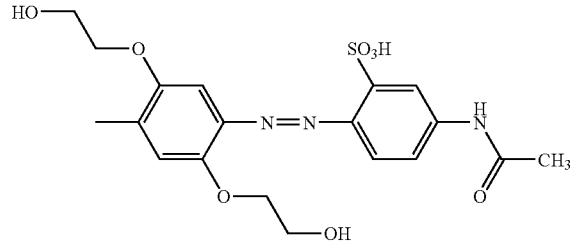 |
| 1-19 | 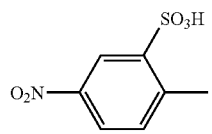 | 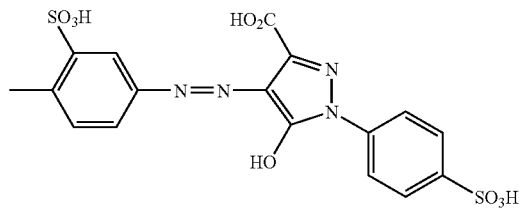 |

|   | A | B | R |
|---|---|---|---|
| 2-1 | 3-(H₂O₃P)-C₆H₄– | 2,5-diethoxy-4-methylphenyl (with 4,6-dimethyl, 2,5-diOC₂H₅) | H |
| 2-2 | 3-(H₂O₃P)-C₆H₄– | 2-OCH₃-5-OC₂H₅-4,6-dimethylphenyl | H |
| 2-3 | 3-(HO₂C)-C₆H₄– | 2,5-diethoxy-4,6-dimethylphenyl | H |
| 2-4 | 3,5-di(HO₂C)-C₆H₃– | 4,8-dimethyl-naphthalene-2-SO₃H | H |
| 2-5 | 3,5-di(HO₂C)-C₆H₃– | 2,5-bis(OC₂H₄OH)-4,6-dimethylphenyl | H |
| 2-6 | 3-(HO₂C)-C₆H₄– | 4,8-dimethyl-naphthalene-2-SO₃H | –CH₂CO₂H |
| 2-7 | 3-HO₃S-C₆H₄–N=N–(4-methyl-3-methoxyphenyl)– | 2,4-dimethyl-3-methylphenyl | 3-SO₃H-C₆H₄– |

Structure (header):

A—N=N—B—N=N—(3-sulfo-4-hydroxy-7-(NHR)-naphthalen-2-yl)

Note: Parent structure is 4-hydroxy-3-(azo-B-azo-A)-7-(NHR)-naphthalene-2-sulfonic acid.

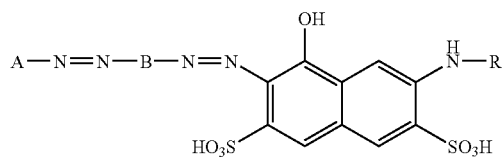
| | A | B | R |
|---|---|---|---|
| 2-8 | 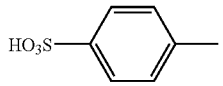 | 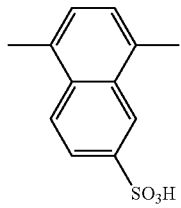 | H |
| 2-9 | 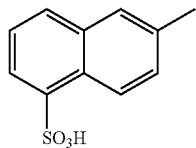 | 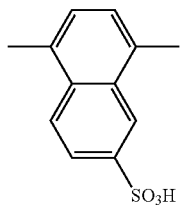 | H |
| 2-10 | 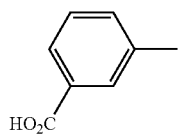 | 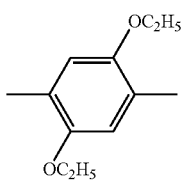 | H |
| 2-11 | 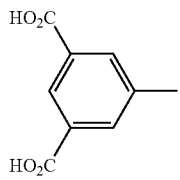 | 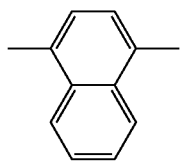 | H |
| 2-12 | 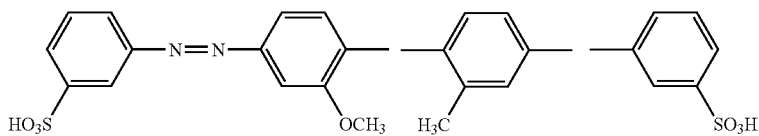 | | |
| 2-13 | 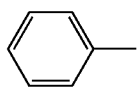 | 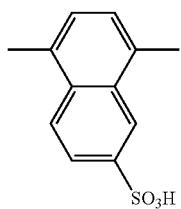 | —COCH$_3$ |

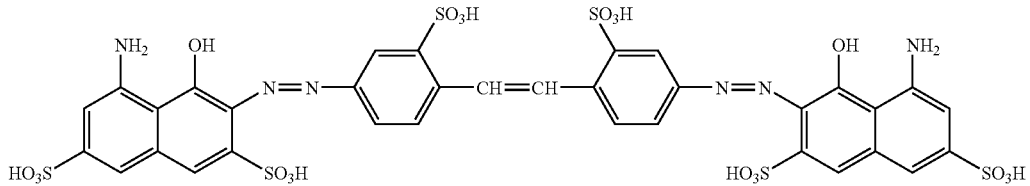

3-1

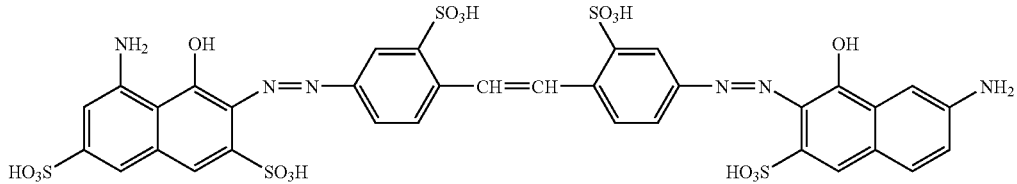

3-2

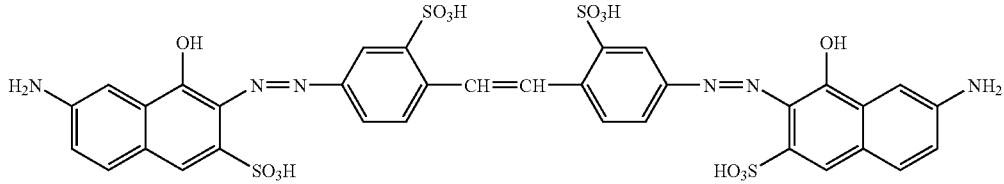

3-3

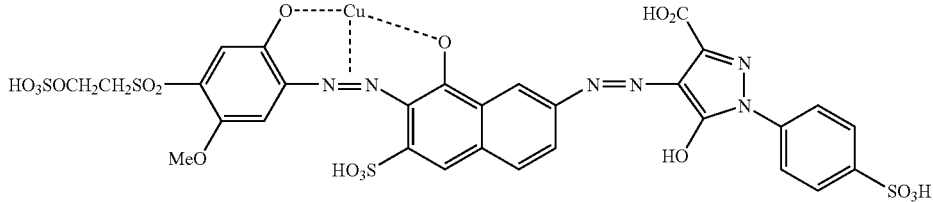

4-1

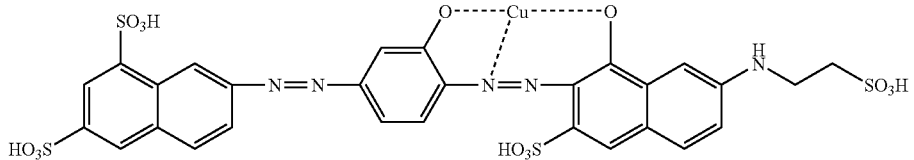

4-2

Other than the dyes represented by the above formulae, the dyes disclosed in the following patents can also be preferably used as longer wave dye L: JP-A-10-130557, JP-A-9-255906, JP-A-7-97541, JP-A-6-234944, EP-A-982371, JP-A-2002-302619, JP-A-2002-327131, JP-A-2002-265809, WO 2000/43450, WO 2000/43451, WO 2000/43452, WO 2000/43453, WO 2003/106572 and WO 2003/104332.

The black ink composition in the invention contains longer wave dye L in ink in an amount of preferably from 0.2 to 30 weight %, particularly preferably from 0.5 to 15 weight %, and most preferably from 1 to 10 weight %.

The ratio of shorter wave dye S and longer wave dye L is shorter wave dye S to longer wave dye L of preferably from 1 to 50 weight %, more preferably from 5 to 40 weight %, and most preferably from 10 to 30 weight %.

Additives:

The additives to be contained in the black ink composition in the invention are described in detail below.

The black ink composition in the invention contains an additive selected from the group consisting of a bronzing inhibitor and an ozone resisting improver.

Bronzing Inhibitor:

A bronzing inhibitor to be contained in the black ink composition in the invention is described below. The bronzing inhibitor for use in the invention is preferably a colorless water-soluble planar compound having more than ten delocalized π electrons in one molecule.

There is no least upper bound of the number of π electron, but the number is preferably 80 or less, more preferably 50 or less, and particularly preferably 30 or less. More than ten π electrons may form one great delocalization system, or may form two or more non-localization systems. A compound having 2 or more aromatic rings in one molecule is preferred. The aromatic ring may be an aromatic hydrocarbon ring, may be an aromatic heterocyclic ring containing hetero atoms, or the aromatic rings may be condensed to form one aromatic ring. The examples of aromatic rings include benzene, naphthalene, anthracene, pyridine, pyrimidine, pyrazine and triazine.

When the number of π electrons constituting delocalized π electrons increases and π electron system widens, the bronzing inhibitor comes to have absorption in the visible region in many cases. In the invention, a compound slightly colored in the range not affecting an image is also included in a colorless compound. The bronzing inhibitor may be a fluorescent compound, but preferably not having fluorescence, and a compound having λmax of absorption peak on the longest wave side of 350 nm or less, more preferably 320 nm or less, and a molar extinction coefficient of 10,000 or less is more preferred.

The water-soluble planar compound in the invention is preferably a compound soluble in 100 g of water at 20° C. by at least 1 g or more, more preferably soluble by 5 g or more, and most preferably soluble by 10 g or more.

In the case of a compound having 2 or more aromatic rings in one molecule, it is particularly preferred to have at least two soluble groups bonded to the aromatic rings in the molecule. As the useful soluble groups, a sulfo group, a carboxyl group, a hydroxyl group, a phosphono group, a carbonamido group, a sulfonamido group, a quaternary ammonium salt, and other groups well known in the industry are exemplified, but the invention is not limited thereto. Of these groups, a sulfo group and a carboxyl group are preferred, and a sulfo group is most preferred.

The number of the positions of usable substituents alone restricts the largest number of the soluble groups in a molecule, but it is sufficient that the same or different ten or more groups are present in a molecule for practical purpose. The counter cations of these soluble groups are not particularly limits, and alkali metal, ammonium, and organic cations (e.g., tetramethylammonium, guanidinium and pyridinium) can be exemplified, and alkali metal and ammonium are preferred, lithium, sodium and ammonium are more preferred, and lithium and ammonium are most preferred.

As the specific compounds, the compounds disclosed in JP-A-63-55544, JP-A-3-146947, JP-A-3-149543, JP-A-2001-201831, JP-A-2002-139822, JP-A-2002-196460, JP-A-2002-244257, JP-A-2002-244259, JP-A-2002-296743, JP-A-2002-296744 and Japanese Patent Application No. 2002-17728 can be exemplified.

Above all, the compound represented by formula (8) is preferably used.

A-X-L-(Y—B)$_n$ (8)

wherein A, L and B each represents an aromatic group (an aryl group and an aromatic heterocyclic group); X and Y each represents a divalent linking group; and n represents 0 or 1. The aromatic group may be a monocyclic ring or a condensed ring. The examples of the divalent linking group include an alkylene group, an alkenylene group, —CO—, —SO$_n$— (n is 0, 1 or 2), —NR— (R represents a hydrogen atom, an alkyl group, an aryl group or a heterocyclic residue), —O—, and divalent linking groups obtained by combining these linking groups. The compound represented by formula (8) contains at least one ionic hydrophilic group selected from a sulfo group, a carboxyl group, a phenolic hydroxyl group and a phosphono group. These ionic hydrophilic groups may take the form of a salt, and the counter anions are not particularly restricted, e.g., alkali metals, ammonium, and organic cations (e.g., tetramethylammonium, guanidinium and pyridinium) can be exemplified. Alkali metals and ammonium are preferred, lithium, sodium and ammonium are particularly preferred, and lithium and ammonium are most preferred.

The compound represented by formula (8) may have a substituent other than ionic hydrophilic groups, specifically an alkyl group, an aryl group, an aralkyl group, a heterocyclic group, an alkoxyl group, an aryloxy group, a hydroxyl group, an amino group (including an anilino group and a heterocyclic amino group), an acyl group, an acylamino group, a ureido group, a halogen atom, a sulfamoyl group, a carbamoyl group, a sulfonamido group, a sulfonyl group, a sulfenyl group, and a sulfinyl group can be exemplified as the substituents other than ionic hydrophilic groups. These groups may further have a substituent. Of the compounds represented by formula (8), compounds in which n represents 1 are preferred, and at least one of A, L and B represents an aromatic heterocyclic group are also preferred, and those containing from 2 to 4 ionic hydrophilic groups are preferred.

Although it is not clearly known that by what a mechanism the water-soluble planar compound inhibits the bronzing phenomenon, it is thought that the compound functions as an aggregation releaser to release aggregation by acting stronger interaction of π electrons to a coloring matter aggregated (associated) by the interaction of π electrons among molecules of the coloring matter, as a result the bronzing phenomenon is improved. It is important that the aggregation releaser is planar and π electron system is widely spreading for the purpose of getting into an aggregated coloring matter or for exhibiting stronger interaction of π electrons to the coloring matter on the surface of the coloring matter association. In addition, it is also important for the aggregation releaser to have sufficient solubility so that the aggregation releaser itself or the complex formed by the coloring matter and the aggregation releaser should not precipitate. The number of necessary π electrons widely varies according to the size of the coloring matter used for ink jet recording, but it is presumed that the aggregation releaser is necessary to be a colorless water-soluble planar compound having more than 10 delocalized π electrons in one molecule, since the coloring matter used for ink jet recording has a widely spreading planar structure to raise a fixing ability as represented by direct coloring matters.

As the examples of preferred water-soluble planar compounds, the compounds disclosed in the aforementioned JP-A-2002-139822, JP-A-2002-196460, JP-A-2002-244257, JP-A-2002-244259, JP-A-2002-296743, JP-A-2002-296744, and Japanese Patent Application No. 2002-17728 can be exemplified. The typical compounds (aggregation releasers) are shown below.

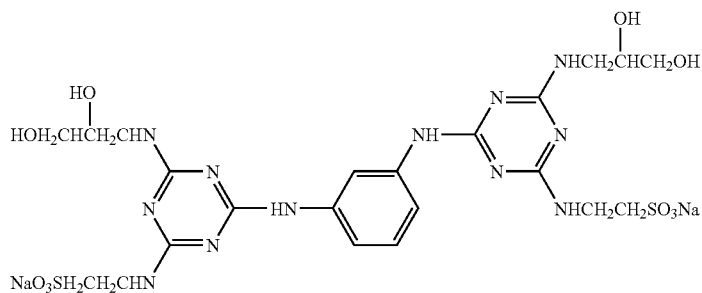
P-1
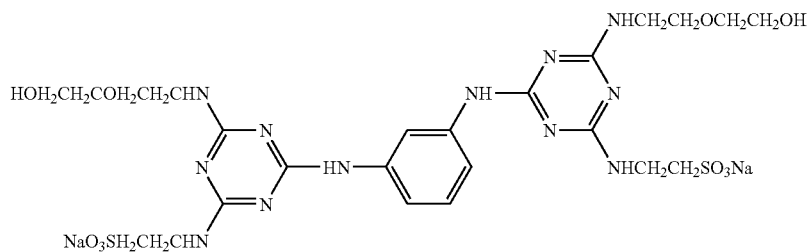
P-2
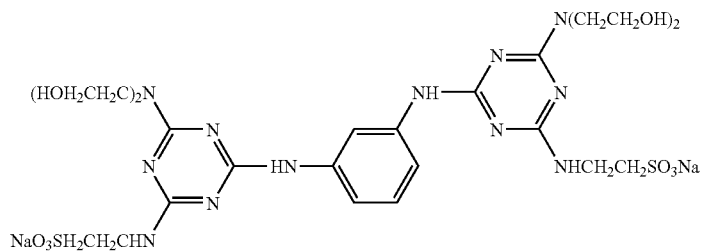
P-3
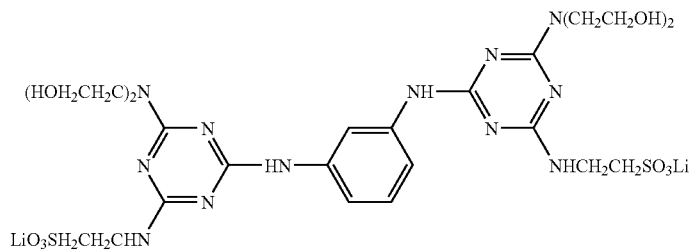
P-4
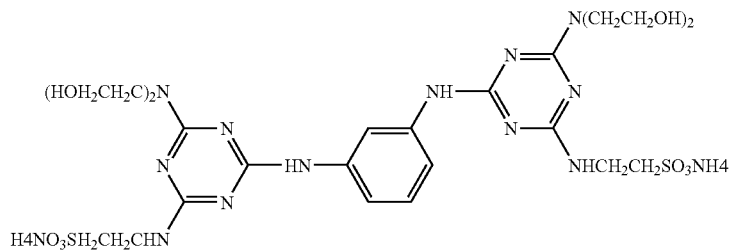
P-5
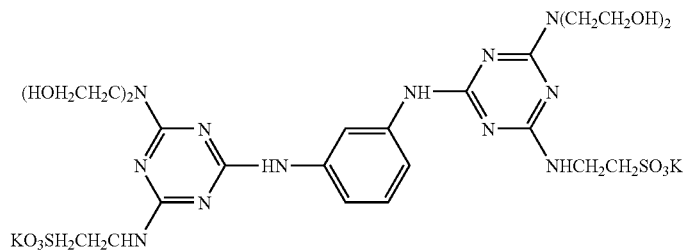
P-6

P-7
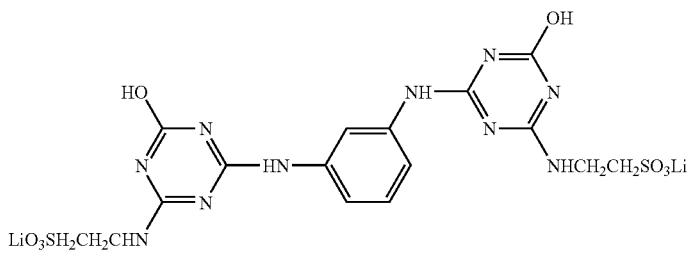
P-8
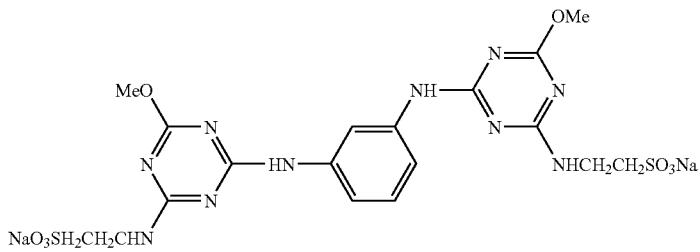
P-9
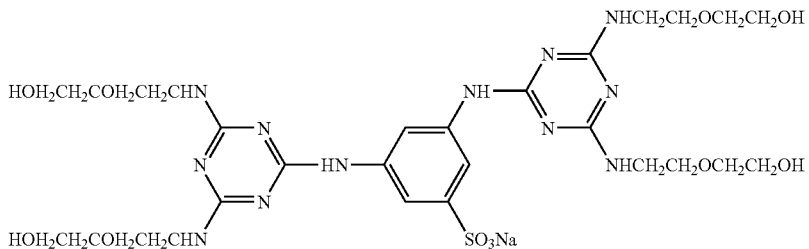
P-10
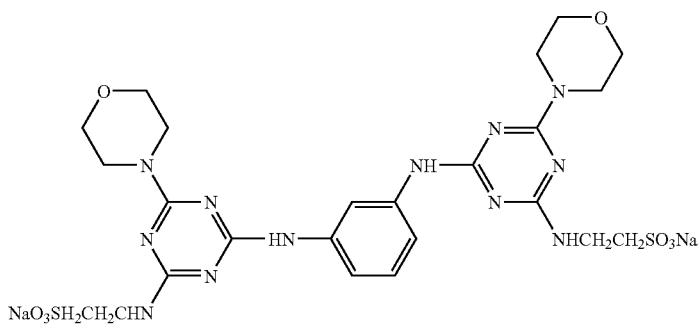
P-11
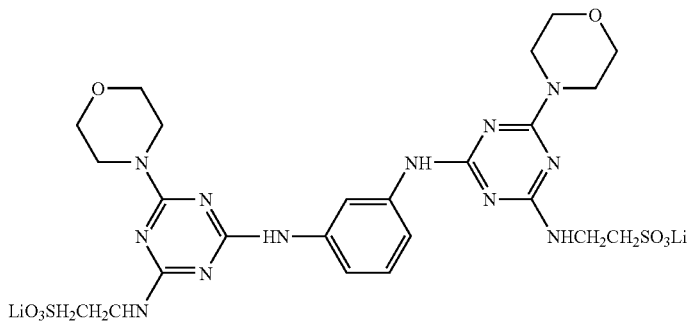

-continued
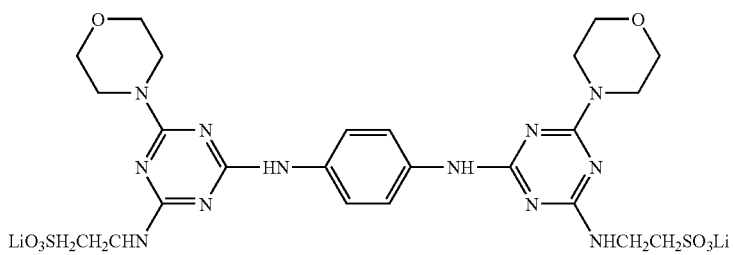
P-12
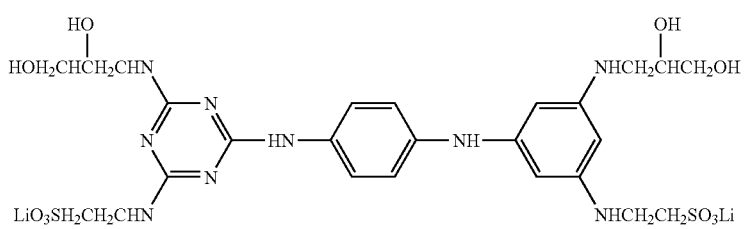
P-13
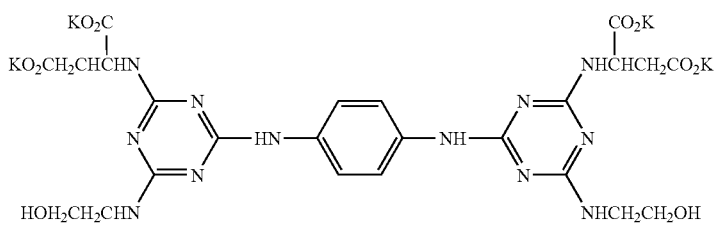
P-14
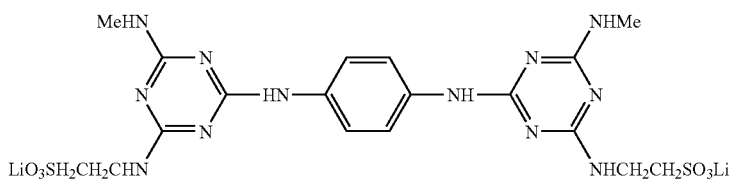
P-15
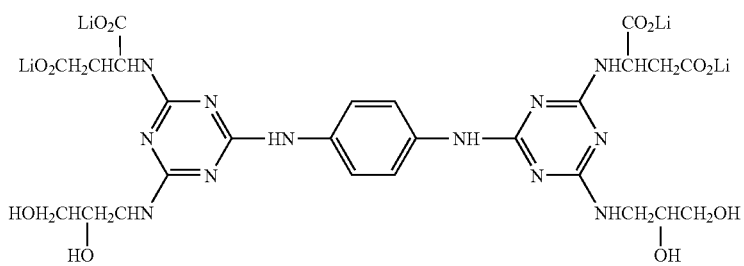
P-16
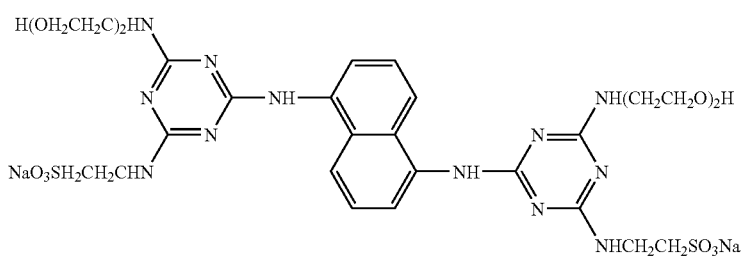
P-17

-continued
P-18
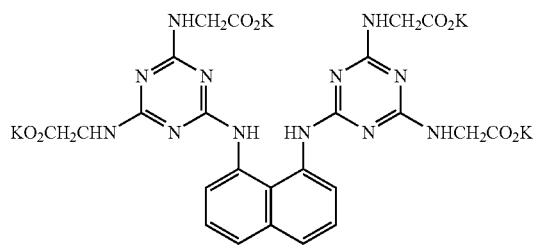
P-19
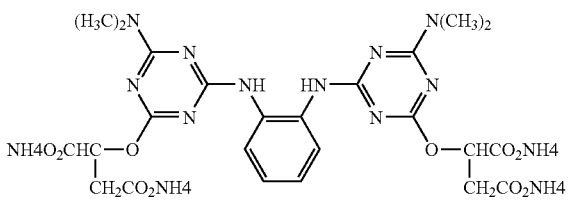
P-20
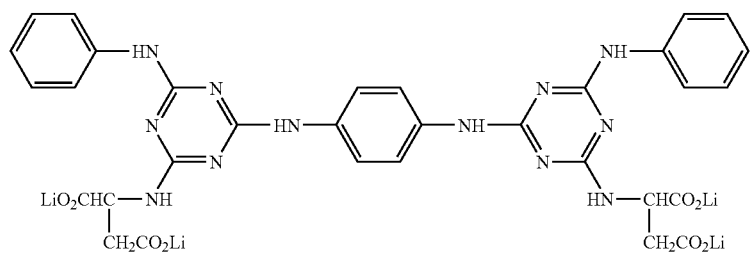
P-21
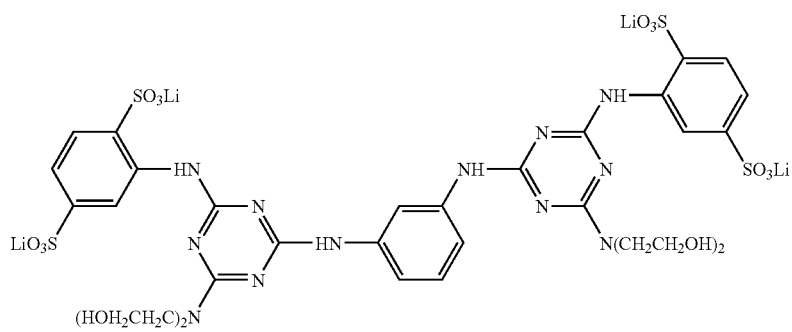
P-22
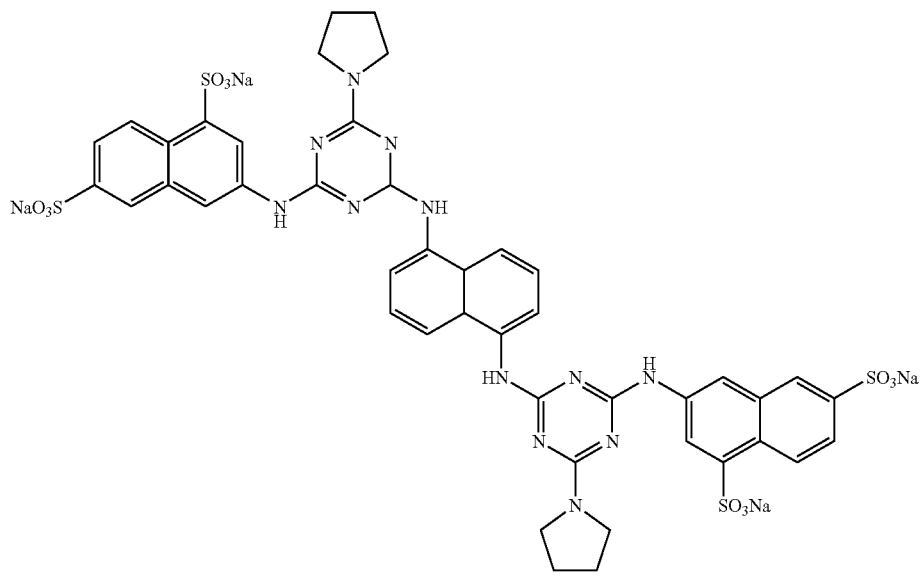
P-23
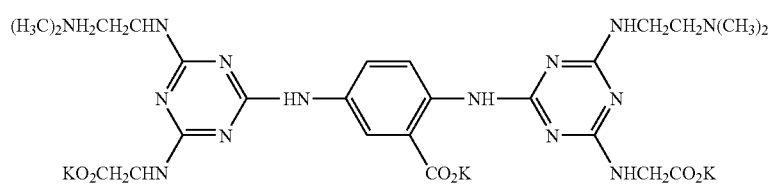

P 24
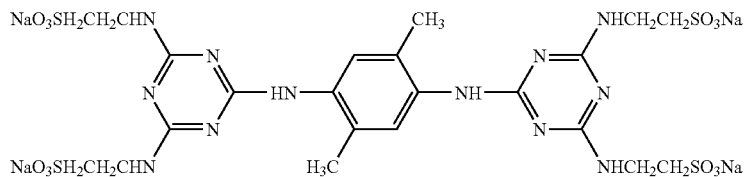
P-25
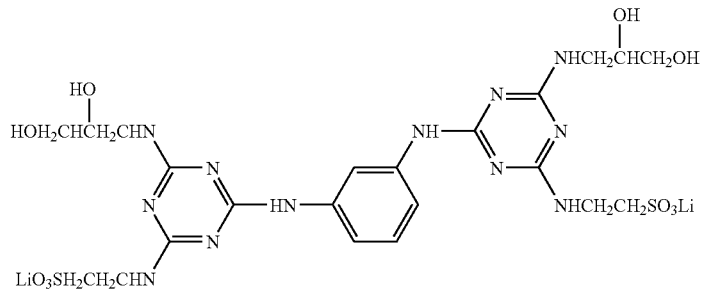
P-26
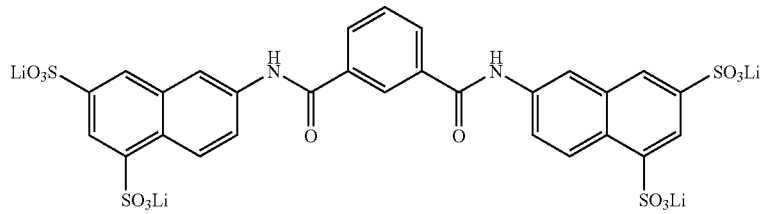
P-27
P-28
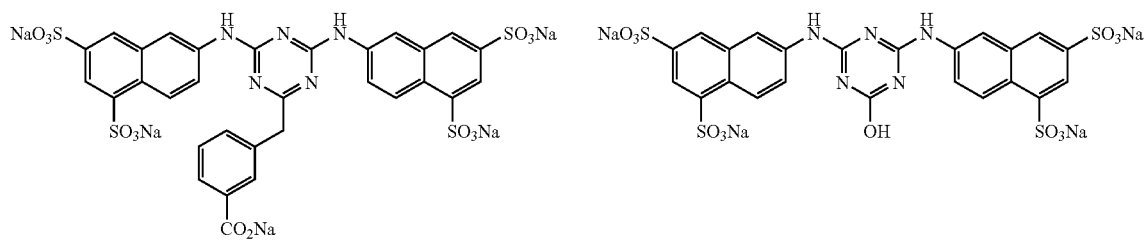
P-29
P-30
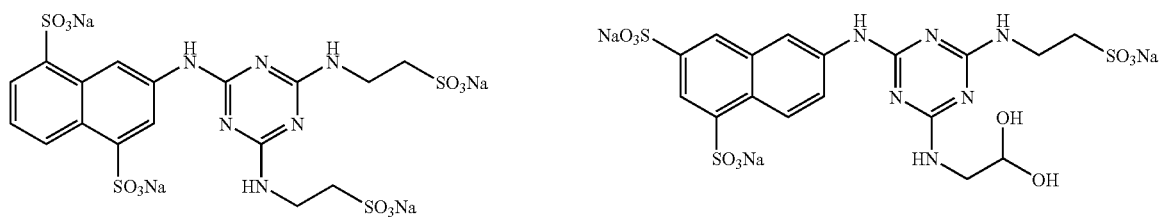
P-31
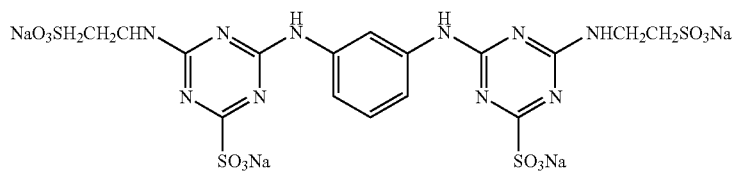
P-32
P-33
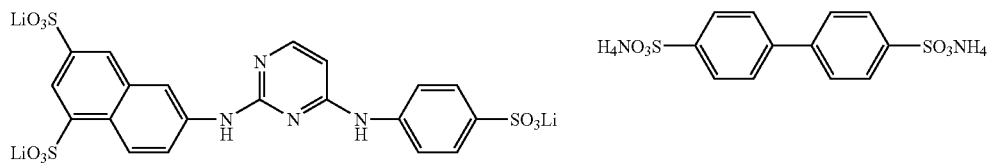

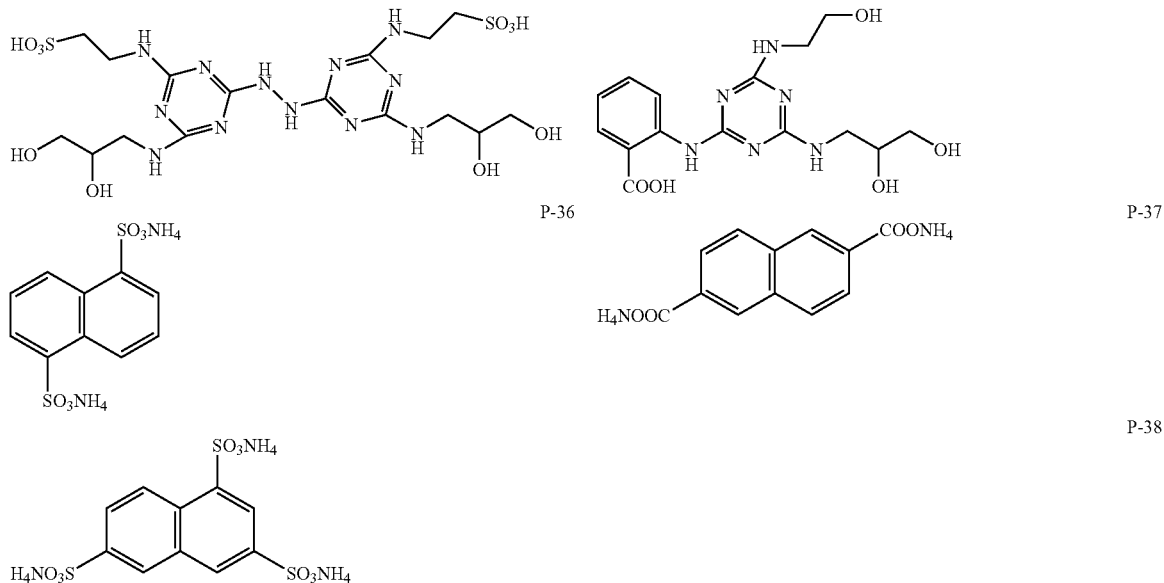

Incidentally, the expression "number of atoms having conjugate π electrons on a per-molecule basis" as used in the invention refers to the number of atoms sharing, regardless of sharing degree, a group of π electrons constituting a conjugated-bond structure capable of assuming an arbitrary conjugated system. Therefore, the number of conjugated electrons corresponds with the number of the atoms defined above. More specifically, taking compounds P-1 to P-38 illustrated above as examples, the number of atoms having conjugate π electrons on a per-molecule basis is a value as shown in Table 1-1.

TABLE 1-1

Number of atoms having conjugate π electrons with respect to compounds P-1 to P-38

| Compound | Number of atoms having conjugate π electrons |
|---|---|
| P-1 | 18 |
| P-2 | 18 |
| P-3 | 18 |
| P-4 | 18 |
| P-5 | 18 |
| P-6 | 18 |
| P-7 | 18 |
| P-8 | 18 |
| P-9 | 18 |
| P-10 | 18 |
| P-11 | 18 |
| P-12 | 18 |
| P-13 | 18 |
| P-14 | 18 |
| P-15 | 18 |
| P-16 | 18 |
| P-17 | 22 |
| P-18 | 22 |
| P-19 | 18 |
| P-20 | 30 |
| P-21 | 30 |
| P-22 | 42 |
| P-23 | 18 |
| P-24 | 18 |

TABLE 1-1-continued

Number of atoms having conjugate π electrons with respect to compounds P-1 to P-38

| Compound | Number of atoms having conjugate π electrons |
|---|---|
| P-25 | 18 |
| P-26 | 26 |
| P-27 | 32 |
| P-28 | 26 |
| P-29 | 16 |
| P-30 | 16 |
| P-31 | 18 |
| P-32 | 22 |
| P-33 | 12 |
| P-34 | 12 |
| P-35 | 12 |
| P-36 | 10 |
| P-37 | 10 |
| P-38 | 10 |

Preferred bronzing inhibiting compounds for use in the invention can be easily synthesized referring to the method disclosed in JP-A-2002-139822.

It is also preferred for the black ink composition in the invention to contain an aromatic compound having a carboxyl group and/or the salt thereof as the bronzing inhibitor.

The aromatic compound having a carboxyl group or the salt thereof may be any compound so long as it is an aromatic compound having at least one carboxyl group in the molecular structure or the salt thereof, but the number of the carboxyl group is preferably one, and a compound having a naphthalene skeleton is preferred. A compound having a naphthalene skeleton and an —OR group (R represents a hydrogen atom or an alkyl group having from 1 to 6 carbon atoms) together with a carboxyl group can also be preferably used. In the compound having a naphthalene skeleton or the salt thereof, the carboxyl group and the —OR group are preferably respectively one. Further, a compound having a carboxyl group at the 2-position and a naphthalene skeleton or the salt thereof is more preferably used. An alkali metal salt of the compound having a carboxyl group at the 2-position and a naphthalene skeleton is still more preferably used. Of the alkali metal salts of the compound having a carboxyl group at the 2-position and a naphthalene skeleton, a lithium salt is particularly preferred not only in the point of the improvement of bronzing resistance but also in the point of the resistance to clogging of nozzles.

As the aromatic compounds having a carboxyl group and the salts thereof, 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid, 4-hydroxybenzoic acid, 2,6-naphthalenedicarboxylic acid and salts of these compounds (particularly lithium salts) are specifically exemplified.

The salt of the aromatic compound having a carboxyl group can be added in the form of a salt and contained in ink, or the aromatic compound having a carboxyl group and a base can be added separately and contained in ink.

The content of these aromatic compounds having a carboxyl group and/or the salts thereof is determined by the kinds of the aromatic compounds having a carboxyl group and/or the salts thereof, the kinds of the dyes, and the kinds of the solvent components, but the content is preferably from 0.1 to 10 wt % based on the total weight of the ink composition, and more preferably from 0.5 to 5 wt %.

In the ink composition in the invention, the content ratio of a dye and the aromatic compound having a carboxyl group and/or the salt thereof is preferably from 1/0.1 to 1/10 by weight, more preferably from 1/0.3 to 1/6. By making the ratio of the aromatic compound having a carboxyl group and/or the salt thereof higher than 1/0.1, the effect of the improvement of the bronzing phenomenon can be sufficiently obtained, and by making the ratio of the aromatic compound having a carboxyl group and/or the salt thereof lower than 1/10, reliability of clogging and the like can be easily secured.

To stably solve the prescribed amounts of a dye and the compound having a carboxyl group and/or the salt thereof, the pH of the ink composition (at 20° C.) is preferably 8.0 or higher. Considering the resistance to the materials of various elements with which the ink composition is brought into contact, the pH of the ink composition is preferably 10.5 or lower. For the better reconciliation of these items, it is more preferred to adjust the pH of the ink composition to 8.5 to 10.0.

The content of the bronzing inhibitor in the ink composition is preferably from 0.1 to 20 wt %, more preferably from 0.5 to 10 wt %, most preferably from 1 to 5 wt %.

Ozone Resisting Improver:

The ozone resisting improver for use in the invention is described in detail below.

As the ozone resisting improver for use in the invention, a guanidine compound is preferred.

The guanidine compound for use in the invention is a compound having an N—C(=N)—N structure.

As the guanidine compound, a compound represented by formula (1) is preferred.

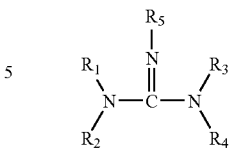

wherein $R_1$, $R_2$, $R_3$ and $R_4$ each represents a hydrogen atom, an alkyl group, an alkoxyl group, an aryl group, a heterocyclic group, or an amino group; $R_5$ represents a hydrogen atom, an alkyl group, an alkoxyl group, an aryl group, or a heterocyclic group; and these alkyl group, alkoxyl group, aryl group, heterocyclic group, and amino group may be substituted or unsubstituted.

As the alkyl group, an alkyl group having from 1 to 12 carbon atoms is preferred, and an alkyl group having from 1 to 6 carbon atoms is particularly preferred.

As the alkoxyl group, an alkoxyl group having from 1 to 12 carbon atoms is preferred, and an alkoxyl group having from 1 to 6 carbon atoms is particularly preferred.

As the aryl group, an aryl group having from 6 to 18 carbon atoms is preferred, and an aryl group having from 6 to 10 carbon atoms is particularly preferred.

As the heterocyclic group, a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, and a trithianyl group are exemplified.

The hydrogen atoms of the alkyl group, alkoxyl group, aryl group and heterocyclic group represented by $R_1$ to $R_5$ may further be substituted with other arbitrary substituents. As such substituents, a halogen atom, e.g., a chlorine atom, a nitro group, an amino group, a carboxyl group, a hydroxyl group, a carbamoyl group, an amidino group, a guanidino group, and an aryloxy group (the aryl moiety may further be substituted with the substituents exemplified here) are exemplified. Two or more of these substituents may be substituted in one and the same molecule. The hydrogen atoms of the above amino group, carbamoyl group, amidino group, and guanidino group may be substituted with the alkyl group, alkoxyl group, aryl group or heterocyclic group represented by $R_1$ to $R_5$.

The hydrogen atom of the amino group represented by $R_1$ to $R_4$ may be substituted with the alkyl group, aryl group or heterocyclic group represented by $R_1$ to $R_5$.

The guanidine compounds may be the form of a salt or a metal complex. For example, hydrochloride, nitrate, phosphate, sulfamate, carbonate and acetate are exemplified.

The compound represented by formula (1) can be obtained at least by the process of the reaction of the applicable iminoether hydrochloride with ammonia.

The guanidine compound may be a polymer having an N—C(=N)—N structure. As such polymers, compounds containing a repeating unit represented by any of formulae (1-Aa), (1-Ab) and (1-Ac) are exemplified, but the invention is not limited thereto. The compounds containing any of these repeating units may be oligomers. The compound containing the repeating unit represented by formula (1-Ac) may be a monomer. Further, these compounds are preferably salts with acids.

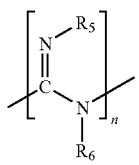
(1-Aa)

wherein $R_5$ has the same meaning as above, $R_6$ represents any of $R_1$, $R_2$, $R_3$ and $R_4$; n-piece of $R_5$ and $R_6$ may be the same or different; n represents an integer of 2 or more, preferably from 2 to 30, and more preferably from 2 to 15. The compound containing the repeating unit represented by formula (1-Aa) may be a monomer, or a copolymer with other repeating units, e.g., azetidinium, etc. The terminal structure can be arbitrarily selected but a hydrogen atom, an alkyl group, an alkoxyl group, an aryl group, a heterocyclic group or an amino group is preferred.

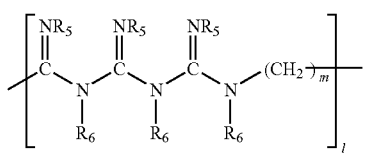
(1-Ab)

wherein $R_5$ and $R_6$ have the same meaning as above; each of 1-piece of $R_5$ and $R_6$ may be the same or different, 1 represents an integer of 2 or more, preferably from 2 to 10, and more preferably from 2 to 5; m represents an integer of 1 or more, preferably from 1 to 6, and more preferably from 1 to 3. The compound containing the repeating unit represented by formula (1-Ab) may be a monomer, or a copolymer with other repeating units, e.g., azetidinium, etc. The terminal structure can be arbitrarily selected but a hydrogen atom, an alkyl group, an alkoxyl group, an aryl group, a heterocyclic group or an amino group is preferred.

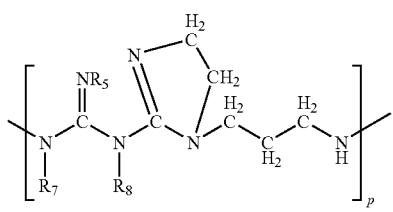
(1-Ac)

wherein $R_5$ has the same meaning as above; $R_7$ has the same meaning as $R_1$ or $R_2$; $R_8$ has the same meaning as $R_4$ or $R_5$; p-piece of $R_5$, $R_7$ and $R_8$ may be the same or different, p represents an integer of 1 or more, preferably from 1 to 10, and more preferably from 1 to 5. The compound containing the repeating unit represented by formula (1-Ac) may be a monomer, or a copolymer with other repeating units, e.g., azetidinium, etc. The terminal structure can be arbitrarily selected but a hydrogen atom, an alkyl group, an alkoxyl group, an aryl group, a heterocyclic group or an amino group is preferred.

In the invention, it is also preferred to use a thiol compound, an amidine compound, a carbazide compound and a hydrazide compound as the ozone resisting improver.

These compounds are described in detail below.

Thiol Compound:

The thiol compound for use in the invention is a compound having an SH group, and aromatic thiol and aliphatic thiol are preferred, and a compound represented by formula (9) is preferred.

$$R-SH \quad (9)$$

wherein R represents an alkyl group, an aryl group or a heterocyclic group.

The above R is explained below.

The alkyl group is preferably an alkyl group having from 1 to 12 carbon atoms, more preferably from 1 to 6 carbon atoms.

The aryl group is preferably an aryl group having from 6 to 18 carbon atoms, more preferably from 6 to 10 carbon atoms.

As the heterocyclic group, a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, and a trithianyl group are exemplified.

The hydrogen atoms of the above substituents represented by R may further be substituted with other arbitrary substituents, and as such substituents, e.g., a carboxyl group, an oxo group, an amino group, an amino acid residue (preferably having from 2 to 8 carbon atoms), an ammonium group, a hydroxyl group, a thiol group, an alkoxyl group (preferably having from 1 to 12 carbon atoms), an acylamino group (preferably having from 1 to 12 carbon atoms, and the carboxyl group and the amino group may be substituted), and a carbamoyl group are exemplified, and two or more of these substituents may be substituted in one and the same molecule.

As the synthesizing method of the compound represented by formula (9), e.g., thiol wherein R is an aryl group is obtained by the reaction of the applicable aryl Grignard reagent and simple sulfur, and thiol wherein R is an alkyl group is obtained by the reaction of the applicable alkyl halide and sodium hydrogensulfide or thiourea.

Amidine Compound:

The amidine compound for use in the invention means a compound having a structure such that a —C(=NH)—NH$_2$ group (an amidino group) is bonded to the carbon atom of a carbon-containing group, and one or more hydrogen atoms of the —C(=NH)—NH$_2$ group may be substituted with a substituent.

As the amidine compound, a compound represented by formula (10) is preferred.

(10):

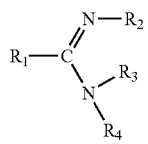

wherein $R_1$, $R_2$, $R_3$ and $R_4$ each represents a hydrogen atom, an alkyl group, an aryl group or a heterocyclic group, and when $R_1$ contains a nitrogen atom, the nitrogen atom does not bond to C in the formula.

The alkyl group is preferably an alkyl group having from 1 to 12 carbon atoms, more preferably from 1 to 6 carbon atoms.

The aryl group is preferably an aryl group having from 6 to 18 carbon atoms, more preferably from 6 to 10 carbon atoms.

As the heterocyclic group, a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, and a trithianyl group are exemplified.

The hydrogen atoms of the above substituents represented by $R_1$ to $R_4$ may further be substituted with other arbitrary substituents, and as such substituents, a halogen atom, e.g., a chlorine atom, a nitro group, an amino group, a carboxyl group, a carbamoyl group, an amidino group, and an aryloxy group (the aryl moiety may further be substituted with the substituents exemplified here) are exemplified. Two or more of these substituents may be substituted in one and the same molecule. The hydrogen atoms of the above amino group, carbamoyl group, and amidino group may be substituted with the alkyl group, aryl group or heterocyclic group represented by $R_1$ to $R_4$.

The amidine compounds may be the form of a salt such as hydrochloride.

The compound represented by formula (10) can be obtained at least by the process of the reaction of the applicable iminoether hydrochloride with ammonia.

Carbazide Compound:

The carbazide compound for use in the invention means carbazide and derivatives thereof, preferably a compound represented by formula (11): $R_5R_6NCONHNR_7R_8$ (wherein $R_5$ to $R_8$ each represents a hydrogen atom or an organic group).

As the organic group, those represented by $R_1$ to $R_4$ above are preferably used.

The hydrogen atoms of the substituents represented by $R_5$ to $R_8$ may further be substituted with other arbitrary substituents. As such substituents, besides the substituents capable of substituting on $R_1$ to $R_4$ as exemplified above, —NHCONHNR$_9$R$_{10}$ (wherein $R_9$ and $R_{10}$ each represents an organic group, and the preferred examples of the organic groups are the same as those in $R_1$ to $R_4$) can be exemplified as preferred substituent. In the invention, —NHCONHNR$_9$R$_{10}$ is called a carbazide structure. The carbazide compounds for use in the invention are compounds having preferably 2 or more carbazide structures, more preferably from 2 to 6, in one and the same molecule.

The carbazide compounds represented by formula (11) can be obtained specifically by the condensation reaction and the like of applicable isocyanate, diisocyanate or a urea derivative with hydrazine compounds represented by $NH_2NR_7R_8$ ($R_7$ and $R_8$ have the same meaning as above).

Hydrazide Compound:

The hydrazide compound for use in the invention means hydrazide and derivatives thereof, preferably a compound represented by formula (12): $R_{11}CONHNR_{12}R_{13}$ ($R_{11}$, $R_{12}$ and $R_{13}$ each represents a hydrogen atom, a hydrazino group or an organic group, and $R_{11}$ may be bonded to $R_{12}$ or $R_{13}$ to form a ring).

As the organic group, those represented by $R_1$ to $R_4$ in formula (10) are preferably used.

The hydrogen atoms of the substituents represented by $R_{11}$ to $R_{13}$ may further be substituted with other arbitrary substituents. As such substituents, besides the substituents capable of substituting on $R_1$ to $R_4$ as exemplified above, an acyl group, a cyano group, an alkoxyl group, an aralkyloxy group, a benzoyl group and —CONHNR$_{14}$R$_{15}$ (wherein $R_{14}$ and $R_{15}$ each represents an organic group, and the preferred examples of the organic groups are the same as those in $R_1$ to $R_4$ above) can be exemplified as preferred substituents. In the invention, —CONHNR$_{14}$R$_{15}$ is called a hydrazide structure. The hydrazide compounds for use in the invention are compounds having preferably 2 or more hydrazide structures, more preferably from 2 to 6, in one and the same molecule.

The hydrazide compounds represented by formula (12) can be obtained specifically by the condensation reaction and the like of applicable carboxylic acid ester, acid derivatives such as acid halide, or acid anhydride with hydrazine compounds represented by $NH_2NR_{12}R_{13}$ ($R_{12}$ and $R_{13}$ have the same meaning as above).

The content of the ozone resisting improver in the ink composition is preferably from 0.1 to 20 wt %, more preferably from 0.5 to 15 wt %, most preferably from 1 to 7.5 wt %.

Other Additives:

Other additives capable of being contained in the black ink composition in the invention are described below.

Surfactant:

As the surfactants usable in the invention, anionic surfactants, e.g., fatty acid salts, higher alcohol esters, alkylbenzenesulfonates, sulfosuccinates, and phosphoric esters of higher alcohols, cationic surfactants, e.g., aliphatic amine salts and quaternary ammonium salts, nonionic surfactants, e.g., ethylene oxide adducts of higher alcohol, ethylene oxide adducts of alkylphenol, ethylene oxide adducts of polyhydric alcohol fatty acid ester, acetylene glycol and ethylene oxide adducts of acetylene glycol, amphoteric surfactants, e.g., amino acid series and betaine series, fluorine series and silicone compounds are exemplified. These surfactants can be used alone, or two or more surfactants may be used in combination.

Of the above surfactants, betaine series surfactants are effective to improve water tightness of images and to prevent bleeding of the printed ink. The betaine series surfactants here include those used in the dispersion of oil-soluble dyes.

The betaine series surfactants for use in the invention are compounds having both a cationic moiety and an anionic moiety in the molecule, and also have surface activity. As the cationic moiety, the nitrogen atom of amine, the nitrogen atom of a heterocyclic aromatic ring and a phosphorus atom are exemplified. Of these, the nitrogen atom of amine and the nitrogen atom of a heterocyclic aromatic ring are preferred. A quaternary nitrogen atom is particularly preferred. As the anionic moiety, a hydroxyl group, a thio group, a sulfonamido group, a sulfo group, a carboxyl group, an imido group, a phosphoric acid group, and a phosphonic acid group are exemplified. Of these, a carboxyl group and a sulfo group are particularly preferred. The electric charge of betaine compounds may be any of cationic, anionic and neutral, but neutral is preferred.

The betaine series surfactant for use in the invention is preferably a compound represented by formula (13).

wherein R represents a hydrogen atom, an alkyl group, an aryl group or a heterocyclic group; $L_3$ represents a divalent or higher linking group; M represents a hydrogen atom, an alkali metal atom, an ammonium group, a protonated organic amine or nitrogen-containing heterocyclic group, or a quaternary ammonium group, and when M is the counter ion of the ammonium ion of N atom in the formula, M represents a group not present as the cation; q represents an integer of 1 or more, r represents an integer of from 1 to 4, p represents an integer of from 0 to 4, and p+r is 3 or 4, when p+r is 4, the N atom is an ammonium atom ($=N^+=$), when r is 2 or more, $L_3$ may be the same or different, when q is 2 or more, COOM may be the same or different, when r is 2 or more $L_3$-$(COOM)_q$ may be the same or different, and when p is 2 or more, R may be the same or different.

Further, the betaine series surfactant for use in the invention is preferably a compound represented by formula (13-1) or (13-2).

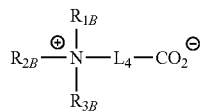

(13-1)

wherein $R_{1B}$, $R_{2B}$ and $R_{3B}$ each represents an alkyl group (which may be substituted, preferably an alkyl group having from 1 to 20 carbon atoms, e.g., a methyl group, an ethyl group, a propyl group, a butyl group, a hexyl group, an octyl group, a dodecyl group, a cetyl group, a stearyl group, an oleyl group, etc.), an aryl group (which may be substituted, preferably an aryl group having from 6 to 20 carbon atoms, e.g., a phenyl group, a tolyl group, a xylyl group, a naphthyl group, a cumyl group, a dodecylphenyl group, etc.), or a heterocyclic group (which may be substituted, preferably a heterocyclic group having from 2 to 20 carbon atoms, e.g., a pyridyl group, a quinolyl group, etc.), and $R_{1B}$, $R_{2B}$ and $R_{3B}$ may be linked to each other to form a cyclic structure, and an alkyl group is particularly preferred of these substituents; $L_4$ represents a divalent linking group, and divalent linking groups containing an alkylene group or an arylene group as the fundamental constitutional unit are preferred, the divalent linking groups may contain hetero atoms such as an oxygen atom, a sulfur atom and a nitrogen atom on the linking main chain part. $R_{1B}$, $R_{2B}$, $R_{3B}$ and $L_4$ may be substituted with various surfactants. As the examples of the surfactants, e.g., an alkyl group (preferably having from 1 to 20 carbon atoms, more preferably from 1 to 12 carbon atoms, and particularly preferably from 1 to 8 carbon atoms, e.g., methyl, ethyl, isopropyl, tert-butyl, n-octyl, n-decyl, n-hexadecyl, cyclopropyl, cyclopentyl, cyclohexyl, etc., are exemplified), an alkenyl group (preferably having from 2 to 20 carbon atoms, more preferably from 2 to 12 carbon atoms, and particularly preferably from 2 to 8 carbon atoms, e.g., vinyl, allyl, 2-butenyl, 3-pentenyl, etc., are exemplified), an alkynyl group (preferably having from 2 to 20 carbon atoms, more preferably from 2 to 12 carbon atoms, and particularly preferably from 2 to 8 carbon atoms, e.g., propargyl, 3-pentynyl, etc., are exemplified), an aryl group (preferably having from 6 to 30 carbon atoms, more preferably from 6 to 20 carbon atoms, and particularly preferably from 6 to 12 carbon atoms, e.g., phenyl, p-methylphenyl, naphthyl, etc., are exemplified), an amino group (preferably having from 0 to 20 carbon atoms, more preferably from 0 to 12 carbon atoms, and particularly preferably from 0 to 6 carbon atoms, e.g., amino, methylamino, dimethylamino, diethylamino, diphenyl-amino, dibenzylamino, etc., are exemplified), an alkoxyl group (preferably having from 1 to 20 carbon atoms, more preferably from 1 to 12 carbon atoms, and particularly preferably from 1 to 8 carbon atoms, e.g., methoxy, ethoxy, butoxy, etc., are exemplified), an aryloxy group (preferably having from 6 to 20 carbon atoms, more preferably from 6 to 16 carbon atoms, and particularly preferably from 6 to 12 carbon atoms, e.g., phenyloxy, 2-naphthyloxy, etc., are exemplified), an acyl group (preferably having from 1 to 20 carbon atoms, more preferably from 1 to 16 carbon atoms, and particularly preferably from 1 to 12 carbon atoms, e.g., acetyl, benzoyl, formyl, pivaloyl, etc., are exemplified), an alkoxycarbonyl group (preferably having from 2 to 20 carbon atoms, more preferably from 2 to 16 carbon atoms, and particularly preferably from 2 to 12 carbon atoms, e.g., methoxycarbonyl, ethoxycarbonyl, etc., are exemplified), an aryloxycarbonyl group (preferably having from 7 to 20 carbon atoms, more preferably from 7 to 16 carbon atoms, and particularly preferably from 7 to 10 carbon atoms, e.g., phenyloxycarbonyl, etc., are exemplified), an acyloxy group (preferably having from 2 to 20 carbon atoms, more preferably from 2 to 16 carbon atoms, and particularly preferably from 2 to 10 carbon atoms, e.g., acetoxy, benzoyloxy, etc., are exemplified), an acylamino group (preferably having from 2 to 20 carbon atoms, more preferably from 2 to 16 carbon atoms, and particularly preferably from 2 to 10 carbon atoms, e.g., acetylamino, benzoylamino, etc., are exemplified), an alkoxycarbonylamino group (preferably having from 2 to 20 carbon atoms, more preferably from 2 to 16 carbon atoms, and particularly preferably from 2 to 12 carbon atoms, e.g., methoxycarbonyl-amino, etc., are exemplified), an aryloxycarbonylamino group (preferably having from 7 to 20 carbon atoms, more preferably from 7 to 16 carbon atoms, and particularly preferably from 7 to 12 carbon atoms, e.g., phenyloxycarbonylamino, etc., are exemplified), a sulfonylamino group (preferably having from 1 to 20 carbon atoms, more preferably from 1 to 16 carbon atoms, and particularly preferably from 1 to 12 carbon atoms, e.g., methanesulfonylamino, benzenesulfonylamino, etc., are exemplified), a sulfamoyl group (preferably having from 0 to 20 carbon atoms, more preferably from 0 to 16 carbon atoms, and particularly preferably from 0 to 12 carbon atoms, e.g., sulfamoyl, methylsulfamoyl, dimethylsulfamoyl, phenyl-sulfamoyl, etc., are exemplified), a carbamoyl group (preferably having from 1 to 20 carbon atoms, more preferably from 1 to 16 carbon atoms, and particularly preferably from 1 to 12 carbon atoms, e.g., carbamoyl, methylcarbamoyl, diethylcarbamoyl, phenylcarbamoyl, etc., are exemplified), an alkylthio group (preferably having from 1 to 20 carbon atoms, more preferably from 1 to 16 carbon atoms, and particularly preferably from 1 to 12 carbon atoms, e.g., methylthio, ethylthio, etc., are exemplified), an arylthio group (preferably having from 6 to 20 carbon atoms, more preferably from 6 to 16 carbon atoms, and particularly preferably from 6 to 12 carbon atoms, e.g., phenylthio, etc., are exemplified), a sulfonyl group (preferably having from 1 to 20 carbon atoms, more preferably from 1 to 16 carbon atoms, and particularly preferably from 1 to 12 carbon atoms, e.g., mesyl, tosyl, etc., are exemplified), a sulfinyl group (preferably having from 1 to 20 carbon atoms, more preferably from 1 to 16 carbon atoms, and particularly preferably from 1 to 12 carbon atoms, e.g., methanesulfinyl, benzenesulfinyl, etc., are exemplified), a ureido group (preferably having from 1 to 20 carbon atoms, more preferably from 1 to 16 carbon atoms, and particularly preferably from 1 to 12 carbon atoms, e.g., ureido, methyl-ureido, phenylureido, etc., are exemplified), a phosphoric acid amide group (preferably having from 1 to 20 carbon atoms, more preferably from 1 to 16 carbon atoms, and particularly preferably from 1 to 12 carbon atoms, e.g., diethylphosphoric acid amide, phenylphosphoric acid amide, etc., are exemplified), a hydroxy group, a mercapto group, a halogen atom (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, as the hetero atoms, e.g., a nitrogen atom, an oxygen atom and a sulfur atom are included and specifically, e.g., imidazolyl, pyridyl, quinolyl, furyl, thienyl, piperidyl, morpholino, benzoxazolyl, benzimidazolyl, benzothiazolyl, carbazolyl, azepinyl, etc., are exemplified), and a silyl group (preferably having from 3 to 40 carbon atoms, more preferably from 3 to 30 carbon atoms, and particularly preferably from 3 to 24 carbon atoms, e.g., trimethylsilyl, triphenylsilyl, etc., are exemplified) are exemplified. These substituents may further be substituted. In the case where there are two or more substituents, they may be the same or different.

These substituents may be linked to each other to form a ring, if possible. Further, a plurality of betaine structures may be contained through $R_{1B}$, $R_{2B}$, $R_{3B}$ or $L_4$.

In the betaine series surfactants for use in the invention, a group having 8 or more carbon atoms is contained in at least one of $R_{1B}$, $R_{2B}$, $R_{3B}$ and $L_4$. It is particularly preferred that a long chain alkyl group is contained in $R_{1B}$, $R_{2B}$, $R_{3B}$.

(13-2)

wherein R, $L_3$ and q have the same meaning as those in formula (13); p1 represents an integer of from 0 to 3; r1 represents an integer of from 1 to 3; $M^1$ represents an alkali metal cation or a hydrogen atom, provided that p1+r1 is 3; when p1 is 2 or more, R may be the same or different; when r1 is 2 or more, $L_3$-$(COOM^1)_q$ may be the same or different.

Formulae (13) and (13-2) are described below.

In the formulae, R represents an alkyl group (which may be substituted, preferably an alkyl group having from 1 to 20 carbon atoms, e.g., a methyl group, an ethyl group, a propyl group, a butyl group, a hexyl group, an octyl group, a dodecyl group, a cetyl group, a stearyl group, an oleyl group, etc.), an aryl group (which may be substituted, preferably an aryl group having from 6 to 20 carbon atoms, e.g., a phenyl group, a tolyl group, a xylyl group, a naphthyl group, a cumyl group, a dodecylphenyl group, etc.), or a heterocyclic group (which may be substituted, preferably a heterocyclic group having from 2 to 20 carbon atoms, e.g., a pyridyl group, a quinolyl group, etc.), and the substituents may be linked to each other to form a cyclic structure. Of these groups, an alkyl group is particularly preferred.

$L_3$ represents a divalent linking group, and divalent linking groups containing an alkylene group or an arylene group as the fundamental constitutional unit are preferred. The divalent linking groups may contain hetero atoms such as an oxygen atom, a sulfur atom and a nitrogen atom on the linking main chain part.

R and $L_3$ may be substituted with various surfactants. As the examples of the surfactants, e.g., an alkyl group (preferably having from 1 to 20 carbon atoms, more preferably from 1 to 12 carbon atoms, and particularly preferably from 1 to 8 carbon atoms, e.g., methyl, ethyl, isopropyl, tert-butyl, n-octyl, n-decyl, n-hexadecyl, cyclopropyl, cyclopentyl, cyclohexyl, etc., are exemplified), an alkenyl group (preferably having from 2 to 20 carbon atoms, more preferably from 2 to 12 carbon atoms, and particularly preferably from 2 to 8 carbon atoms, e.g., vinyl, allyl, 2-butenyl, 3-pentenyl, etc., are exemplified), an alkynyl group (preferably having from 2 to 20 carbon atoms, more preferably from 2 to 12 carbon atoms, and particularly preferably from 2 to 8 carbon atoms, e.g., propargyl, 3-pentynyl, etc., are exemplified), an aryl group (preferably having from 6 to 30 carbon atoms, more preferably from 6 to 20 carbon atoms, and particularly preferably from 6 to 12 carbon atoms, e.g., phenyl, p-methylphenyl, naphthyl, etc., are exemplified), an amino group (preferably having from 0 to 20 carbon atoms, more preferably from 0 to 12 carbon atoms, and particularly preferably from 0 to 6 carbon atoms, e.g., amino, methylamino, dimethylamino, diethylamino, diphenylamino, dibenzylamino, etc., are exemplified), an alkoxyl group (preferably having from 1 to 20 carbon atoms, more preferably from 1 to 12 carbon atoms, and particularly preferably from 1 to 8 carbon atoms, e.g., methoxy, ethoxy, butoxy, etc., are exemplified), an aryloxy group (preferably having from 6 to 20 carbon atoms, more preferably from 6 to 16 carbon atoms, and particularly preferably from 6 to 12 carbon atoms, e.g., phenyloxy, 2-naphthyloxy, etc., are exemplified), an acyl group (preferably having from 1 to 20 carbon atoms, more preferably from 1 to 16 carbon atoms, and particularly preferably from 1 to 12 carbon atoms, e.g., acetyl, benzoyl, formyl, pivaloyl, etc., are exemplified), an alkoxycarbonyl group (preferably having from 2 to 20 carbon atoms, more preferably from 2 to 16 carbon atoms, and particularly preferably from 2 to 12 carbon atoms, e.g., methoxycarbonyl, ethoxycarbonyl, etc., are exemplified), an aryloxycarbonyl group (preferably having from 7 to 20 carbon atoms, more preferably from 7 to 16 carbon atoms, and particularly preferably from 7 to 10 carbon atoms, e.g., phenyloxycarbonyl, etc., are exemplified), an acyloxy group (preferably having from 2 to 20 carbon atoms, more preferably from 2 to 16 carbon atoms, and particularly preferably from 2 to 10 carbon atoms, e.g., acetoxy, benzoyloxy, etc., are exemplified), an acylamino group (preferably having from 2 to 20 carbon atoms, more preferably from 2 to 16 carbon atoms, and particularly preferably from 2 to 10 carbon atoms, e.g., acetylamino, benzoylamino, etc., are exemplified), an alkoxycarbonylamino group (preferably having from 2 to 20 carbon atoms, more preferably from 2 to 16 carbon atoms, and particularly preferably from 2 to 12 carbon atoms, e.g., methoxycarbonylamino, etc., are exemplified), an aryloxycarbonylamino group (preferably having from 7 to 20 carbon atoms, more preferably from 7 to 16 carbon, atoms, and particularly preferably from 7 to 12 carbon atoms, e.g., phenyloxycarbonylamino, etc., are exemplified), a sulfonylamino group (preferably having from 1 to 20 carbon atoms, more preferably from 1 to 16 carbon atoms, and particularly preferably from 1 to 12 carbon atoms, e.g., methanesulfonylamino, benzenesulfonylamino, etc., are exemplified), a sulfamoyl group (preferably having from 0 to 20 carbon atoms, more preferably from 0 to 16 carbon atoms, and particularly preferably from 0 to 12 carbon atoms, e.g., sulfamoyl, methylsulfamoyl, dimethylsulfamoyl, phenylsulfamoyl, etc., are exemplified), a carbamoyl group (preferably having from 1 to 20 carbon atoms, more preferably from 1 to 16 carbon atoms, and particularly preferably from 1 to 12 carbon atoms, e.g., carbamoyl, methylcarbamoyl, diethylcarbamoyl, phenyl-carbamoyl, etc., are exemplified), an alkylthio group (preferably having from 1 to 20 carbon atoms, more preferably from 1 to 16 carbon atoms, and particularly preferably from 1 to 12 carbon atoms, e.g., methylthio, ethylthio, etc., are exemplified), an arylthio group (preferably having from 6 to 20 carbon atoms, more preferably from 6 to 16 carbon atoms, and particularly preferably from 6 to 12 carbon atoms, e.g., phenylthio, etc., are exemplified), a sulfonyl group (preferably having from 1 to 20 carbon atoms, more preferably from 1 to 16 carbon atoms, and particularly preferably from 1 to 12 carbon atoms, e.g., mesyl, tosyl, etc., are exemplified), a sulfinyl group (preferably having from 1 to 20 carbon atoms, more preferably from 1 to 16 carbon atoms, and particularly preferably from 1 to 12 carbon atoms, e.g., methanesulfinyl, benzenesulfinyl, etc., are exemplified), a ureido group (preferably having from 1 to 20 carbon atoms, more preferably from 1 to 16 carbon atoms, and particularly preferably from 1 to 12 carbon atoms, e.g., ureido, methylureido, phenylureido, etc., are exemplified), a phosphoric acid amide group (preferably having from 1 to 20 carbon atoms, more preferably from 1 to 16 carbon atoms, and particularly preferably from 1 to 12 carbon atoms, e.g., diethylphosphoric acid amide, phenylphosphoric acid amide, etc., are exemplified), a hydroxy group, a mercapto group, a halogen atom (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, as the hetero atoms, e.g., a nitrogen atom, an oxygen atom and a sulfur atom are included and specifically, e.g., imidazolyl, pyridyl, quinolyl, furyl, thienyl, piperidyl, morpholino, benzoxazolyl, benzimidazolyl, benzothiazolyl, carbazolyl, azepinyl, etc., are exemplified), and a silyl group (preferably having from 3 to 40 carbon atoms, more preferably from 3 to 30 carbon atoms, and particularly preferably from 3 to 24 carbon atoms, e.g., trimethylsilyl, triphenylsilyl, etc., are exemplified) are exemplified. These substituents may further be substituted. In the case where there are two or more substituents, they may be the same or different. Substituents may be linked to each other to form a ring, if possible. Further, a plurality of betaine structures may be contained through R or $L_3$.

M represents an alkali metal cation (e.g., a sodium ion, a potassium ion, a lithium ion, a cesium ion), an ammonium ion, or an organic cation of amine (in the case of primary to tertiary amines, the organic amine means protonated amines, e.g., methylamine, dimethylamine, ethylamine, diethylamine, triethylamine, diazabicycloundecene, diazabicyclooctane, piperidine, pyrrolidine, morpholine, N-methylpiperidine, N-methylmorpholine, pyridine, pyrazine, aniline, N,N-dimethylaniline, etc., and in the case of quaternary ammonium salt, e.g., a tetramethylammonium ion, a tetraethylammonium ion, a trimethylbenzylammonium ion, a methylpyridinium ion, a benzylpyridinium ion, etc.). Of these, an alkali metal cation and a hydrogen atom are particularly preferred.

q represents an integer of 1 or more, preferably 5 or less, and more preferably 2 or less; r represents an integer of from 1 to 4, preferably 1 or 2; p represents an integer of from 0 to 4, preferably 1 or 2, and p+r is 3 or 4; when p+r is 4, the N atom is a quaternary ammonium cation, and one of M becomes a dissociable anion, when q is 2 or more, COOM may be the same or different, when r is 2 or more, $L_3$-$(COOM)_q$ may be the same or different, and when p is 2 or more, R may be the same or different.

Further, it is preferred that a hydrocarbon group having 8 or more carbon atoms is contained in R or $L_3$. The compound represented by formula (13-2) is most preferably represented by formula (13-3):

R—N-$(L_3$-$COOM^1)_2$ wherein R, $L_3$ and $M^1$ respectively have the same meaning as those in formula (13-2); two ($L_3$-$COOM^1$) may be the same or different, two $L_3$ and $M^1$ may be the same or different; R particularly preferably represents an alkyl group; and $L_3$ preferably represents an alkylene group.

The preferred examples of betaine series surfactants are shown below, but of course the invention is not limited thereto.

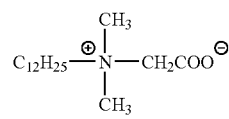

X1-1

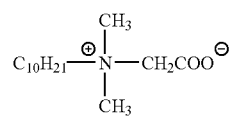

X1-2

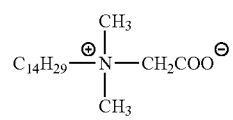

X1-3

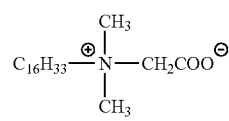

X1-4

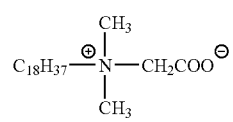

X1-5

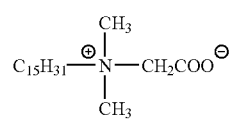

X1-6

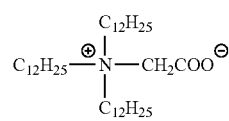

X1-7

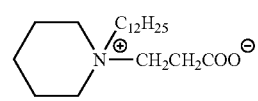

X1-8

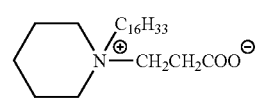

X1-9

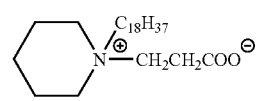

X1-10

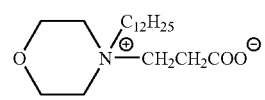

X1-11

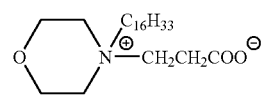

X1-12

-continued
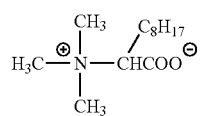 X1-13
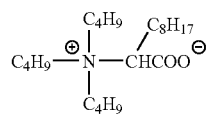 X1-14
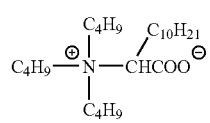 X1-15
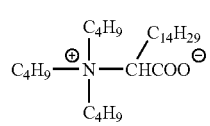 X1-16
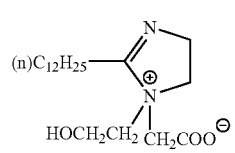 X1-17
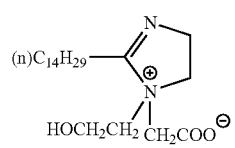 X1-18
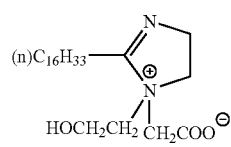 X1-19
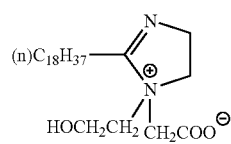 X1-20
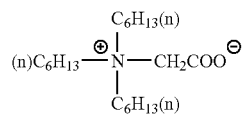 X1-21
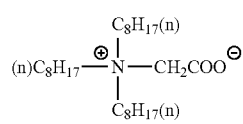 X1-22
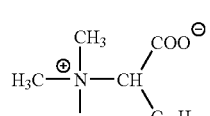 X1-23
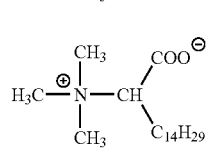 X1-24
-continued
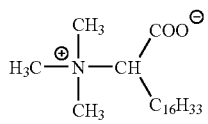 X1-25
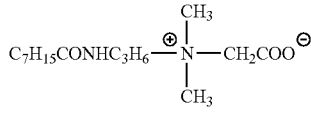 X1-26
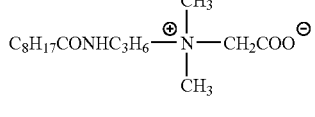 X1-27
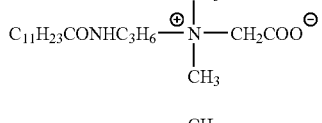 X1-28
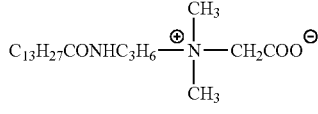 X1-29
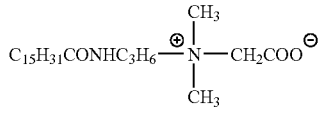 X1-30
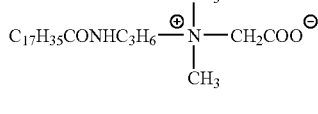 X1-31
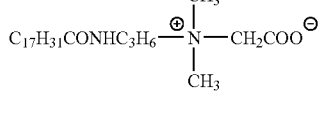 X1-32
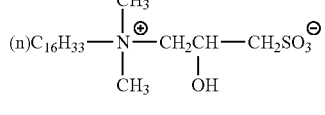 X1-33
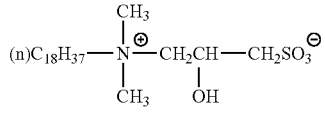 X1-34
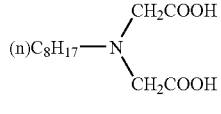 X2-1
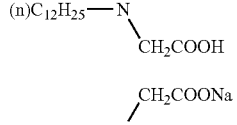 X2-2
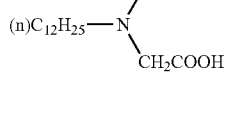 X2-3

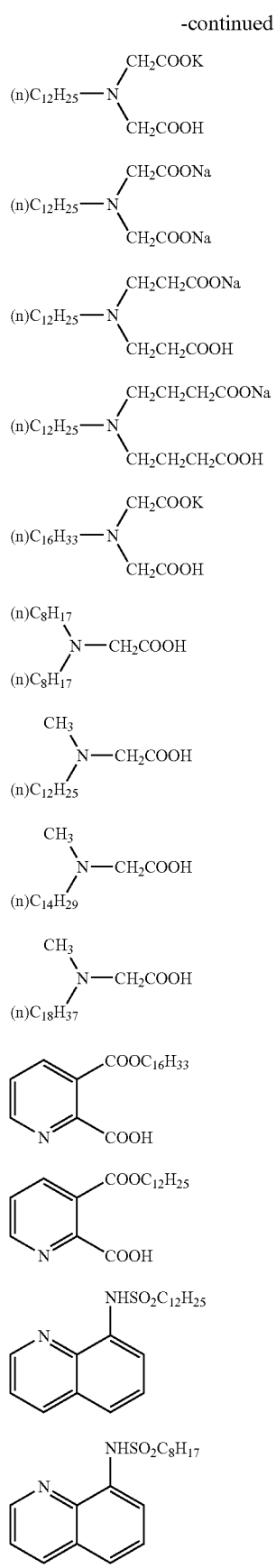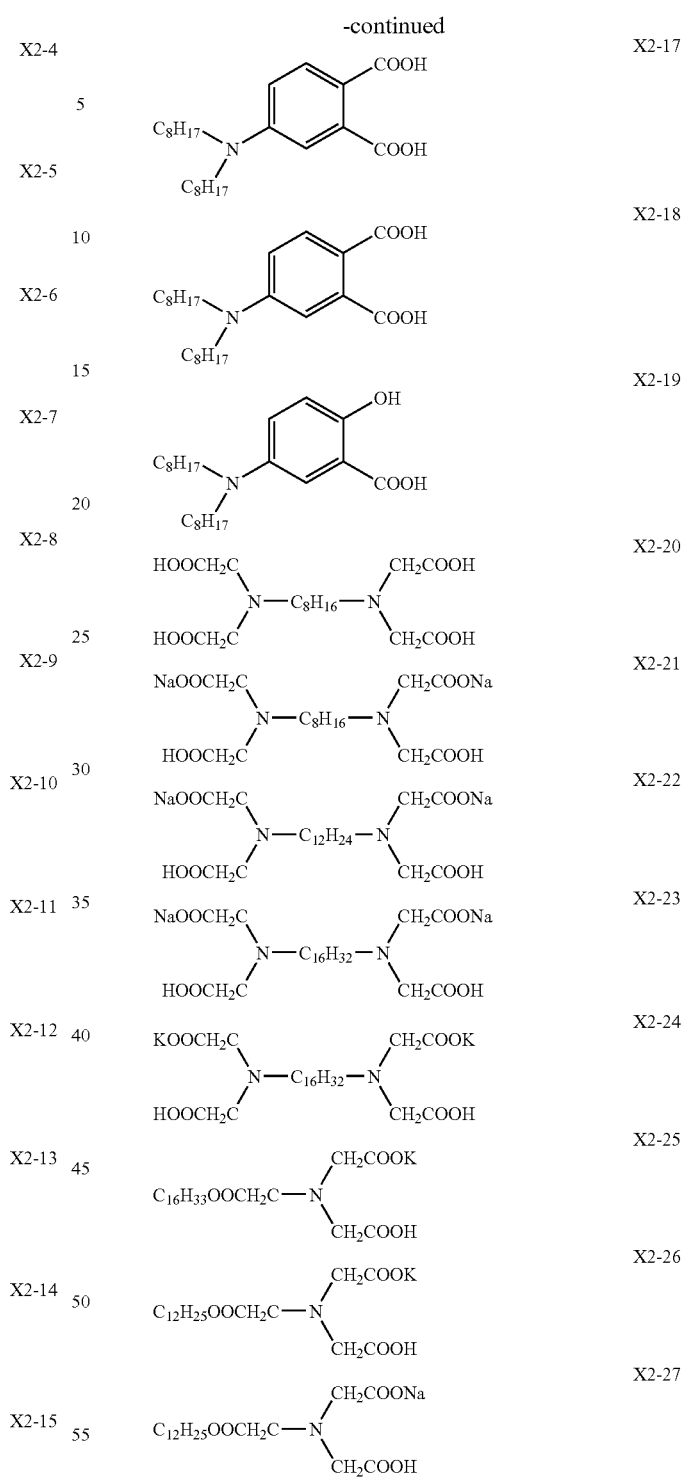

The preferred addition amount of betaine series surfactants is not particularly limited so long as the amount is in the range of capable of exhibiting the effect of the invention, but it is preferably from 0.001 to 50 weight % of the ink composition, more preferably from 0.01 to 20 weight %. Further, in an ink set containing at least two kinds of inks having the same hue but different in densities, it is preferred that the concentration of betaine series surfactant in the ink having the highest density of dye is higher than that in the ink having the lowest density of dye, particularly it is preferred that the higher the density of the dye contained in the ink, the higher the content of betaine series surfactant.

In the case where two kinds of inks of ink A and ink B respectively have dye densities of Da and Db (Da>Db), and the concentrations of betaine series surfactant are Va and Vb (Va>Vb), it is preferred that in the relationship of Da/Db=k (Va/Vb), k is from 0.1 to 10.

Defoaming Agent:

It is preferred for the ink composition in the invention to contain a defoaming agent.

As the defoaming agents that can be used in ink compositions, alcohols, e.g., methanol, ethanol, butanol, and octanol, ethers, e.g., di-t-amylphenoxy ethanol, 3-heptyl cellosolve, nonyl cellosolve, and 3-heptyl carbitol, fatty acid esters, e.g., isoamyl stearate, disuccinate, diethylene glycol distearate, and oxyethylene sorbitan monolaurate, metal soaps, e.g., aluminum stearate and potassium oleate, silicones, e.g., silicone oil, silicone emulsion, and organic modified silicone oil, phosphates and nonionic surfactants are exemplified. Of these defoaming agents, nonionic surfactants are most preferred in the points of their effect and little adverse influence on the ink compositions.

Of nonionic surfactants, a compound represented by formula (14) is preferred as a defoaming agent.

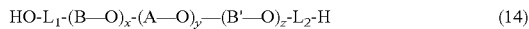
(14)

wherein A represents an alkylene group having 2 or more carbon atoms; B and B' each represents an alkylene group having 3 or more carbon atoms; X, Y and Z each represents an integer of 1 or more; and $L_1$ and $L_2$ each represents an alkylene oxide polymer block having polymerization degree of 0 or more. The alkylene group may be one kind, or two or more kinds may be used, provided that the carbon atom numbers are A<B, A<B'.

The compound represented by formula (14) is a block copolymer of alkylene oxide. As the alkylene oxides, ethylene oxide, propylene oxide, butylene oxide, styrene oxide, cyclohexene oxide, epichlorohydrin, epibromohydrin, methyl glycidyl ether, allyl glycidyl ether and phenyl glycidyl ether are exemplified. Two kinds or more of these alkylene oxides are used.

Of these alkylene oxides, ethylene oxide, propylene oxide, butylene oxide and styrene oxide are preferably used.

The structure of the block copolymer represented by formula (14) is characterized in that the alkylene oxide having a smaller molecular weight (the number of carbon atoms is smaller) is sandwiched with the alkylene oxide having a greater molecular weight. By using such a copolymer, foaming of the ink composition is inhibited, the defoaming property becomes excellent, the physical properties and the preservation stability of the ink composition are not adversely influenced, and the quality and preservation stability of the formed image are free from adverse influences.

The alkylene oxide block copolymer represented by formula (14) is obtained by the addition (ring opening) polymerization of alkylene oxide with the following shown active hydrogen-containing substance as the starting material.

As the active hydrogen-containing substances, dihydric alcohols such as ethylene glycol, propylene glycol and 1,4-butanediol are exemplified.

In a first process, a first polymerized block is formed by the reaction of the starting material with an alkylene oxide compound in the presence of a basic or acid catalyst, and then in a second process a second polymerized block is added by the reaction of the product in the first process with an alkylene oxide compound different from the one used in the first process in the presence of the same or different catalyst. By the addition of alkylene oxide polymerized blocks according to the similar processes, the compound represented by formula (14) can be manufactured.

These reaction processes are generally carried out at a high temperature. Different catalysts may be used in respective processes or the same catalyst may be used. As the examples of proper basic catalysts, sodium or potassium hydroxide, sodium methoxide, and sodium ethoxide are exemplified. As the examples of proper acid catalysts, boron trifluoride, ether boron trifluoride compounds, e.g., diethyl ether boron trifluoride adduct, and triethyloxonium and boron tetrafluoride are exemplified.

The residue of catalytic can be removed by ion exchange resin or neutralization.

The molecular weight of the alkylene oxide copolymers is preferably 10,000 or less, more preferably 8,000 or less. When the molecular weight exceeds 10,000, the solubility in an ink composition lowers, so that the preservation stability of the ink composition is adversely influenced.

Of the alkylene oxide block copolymers, the structure comprising ethylene oxide polymer moiety $(E-O)_y$ sandwiched between propylene oxide moieties $(P-O)_x$ and $(P-O)_z$ as represented by formula (5) is further excellent in foaming inhibition, defoaming property and preservation stability.

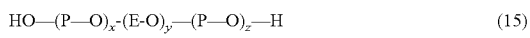
(15)

wherein P represents a propylene group (P—O represents propylene oxide), E represents an ethylene group (E-O represents ethylene oxide), and X, Y and Z each represents an integer of 1 or more.

The weight average molecular weight of the block copolymers represented by formula (14) or (15) is preferably 10,000 or less, more preferably 8,000 or less. When the molecular weight exceeds 10,000, the solubility in an ink composition lowers, so that the preservation stability of the ink composition is adversely influenced. The content of ethylene oxide in the copolymer is preferably from 10 to 80 weight %, more preferably from 10 to 50 weight %. When the content of ethylene oxide is too small, the solubility in an ink composition lowers, so that the preservation stability of the ink composition is adversely influenced, and when the content is too great, a foaming inhibiting property and a defoaming property are deteriorated.

The addition amount of the copolymer in the ink composition is preferably from 0.001 to 5 weight %, more preferably from 0.005 to 3 weight %. When the addition amount is too small, the properties of foaming inhibition and defoaming deteriorate, while when the addition amount is too great, dissolution in an ink composition lowers and the preservation stability of the ink composition is adversely influenced.

As the combination of alkylene oxide of the block copolymer in the invention, the following combinations are exemplified.

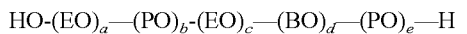

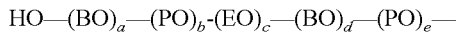

HO-$(EO)_a$—$(BO)_b$-$(EO)_c$—$(BO)_d$-$(EO)_e$—H

HO-(EO)$_a$—(BO)$_b$-(EO)$_c$—(BO)$_d$—(PO)$_e$—H

HO—(PO)$_a$—(BO)$_b$-(EO)$_c$—(BO)$_d$—(PO)$_e$—H

HO-(EO)$_a$—(BO)$_b$—(PO)$_c$—(BO)$_d$-(EO)$_e$—H

HO-(EO)$_a$—(BO)$_b$—(PO)$_c$—(BO)$_d$—(PO)$_e$—H

HO—(BO)$_a$—(PO)$_b$—(PO)$_c$—(BO)$_d$—(PO)$_e$—H

HO-(EO)$_a$—(PO)$_b$-(EO)$_c$—(PO)$_d$-(EO)$_e$—H

HO-(EO)$_a$—(PO)$_b$-(EO)$_c$—(PO)$_d$—(BO)$_e$—H

HO—(BO)$_a$—(PO)$_b$-(EO)$_c$—(PO)$_d$—(BO)$_e$—H

HO-(EO)$_a$—(PO)$_b$-(EO)$_c$—(BO)$_d$—H

HO—(PO)$_a$-(EO)$_b$—(BO)$_c$-(EO)$_d$—H

HO—(PO)$_a$-(EO)$_b$—(BO)$_c$—(PO)$_d$—H

HO—(BO)$_a$—(PO)$_b$-(EO)$_c$—(BO)$_d$—H

HO—(BO)$_a$-(EO)$_b$—(BO)$_c$-(EO)$_d$—H

HO—(BO)$_a$-(EO)$_b$—(BO)$_c$—(PO)$_d$—H

HO-(EO)$_a$—(BO)$_b$—(PO)$_c$—(BO)$_d$—H

HO—(BO)$_a$—(PO)$_b$—(BO)$_c$—(PO)$_d$—H

HO—(PO)$_a$-(EO)$_b$—(PO)$_c$—H

HO—(PO)$_a$-(EO)$_b$—(BO)$_c$—H

HO—(BO)$_a$-(EO)$_b$—(BO)$_c$—H

HO—(BO)$_a$—(PO)$_b$—(BO)$_c$—H

In the above, EO represents ethylene oxide, PO represents propylene oxide, and BO represents butylene oxide. Regarding a, b, c, d and e respectively, the numerical values of preferred range of molecular weights can be selected. The value of a+b+c+d+e is in the range of from 30 to 200, preferably from 40 to 150, and the molecular weight is 10,000 or less.

The specific examples are shown below.

E-1: HO—(CH$_3$CHCH$_2$O)$_m$—(CH$_2$CH$_2$O)$_n$—(CH$_3$CHCH$_2$O)$_{m'}$—H
m+n+m'=60, n: 15

E-2: HO—(CH$_3$CHCH$_2$O)$_m$—(CH$_2$CH$_2$O)$_n$—[CH$_2$CH(CH$_3$)O]$_{m'}$—H
m+n+m'=50, n: 25

E-3: HO—(CH$_3$CHCH$_2$O)$_m$—(CH$_2$CH$_2$O)$_n$—(CH$_3$CHCH$_2$O)$_{m'}$—H
m+n+m'=55, n: 15

E-4: HO—(CH$_3$CHCH$_2$O)$_m$—(CH$_2$CH$_2$O)$_n$—(CH$_3$CHCH$_2$O)$_{m'}$—H
m+n+m'=71, n: 15

E-5: HO—(CH$_3$CHCH$_2$CH$_2$O)$_m$—(CH$_2$CH$_2$O)$_n$—(CH$_3$CHCH$_2$CH$_2$O)$_{m'}$—H
m+n+m'=140, n: 72

E-6: HO—(CH$_3$CHCH$_2$CH$_2$O)$_m$—(CH$_2$CH$_2$O)$_n$—CH$_3$CHCH$_2$CH$_2$O)$_{m'}$—H
m+n+m'=140, n: 80

E-7: HO—(CH$_2$CH$_2$O)$_{n'}$—(CH$_3$CHCH$_2$O)$_m$—(CH$_2$CH$_2$O)$_n$—(CH$_3$CHCH$_2$O)$_{m'}$—(CH$_2$CH$_2$O)$_{n''}$—H
m+m'=50, n: 15, n'+n''=20

The value of n above has distribution breadth practically, so that the above value is the average value.

As the specific examples of the above block copolymers of ethylene oxide and propylene oxide represented by formula (15), Pluronic RPE 1720, RPE 1740, RPE 2035, RPE 2510, RPE 2520, RPE 2525, RPE 3110, 10R5, 10R8, 12R8, 17R1, 17R2, 17R4, 17R8, 22R4, 25R1, 25R2, 25R4, 25R5, 25R8, 31R1, 31R2 and 51R4, manufactured by BASF Japan Ltd. are exemplified.

The defoaming agents in the invention may be used alone, or a plurality of the defoaming agents may be used. Further, the defoaming agents in the invention may be used in combination with the above defoaming agents.

Metal Chelating Agent:

It is preferred for the black ink composition in the invention to further contain a metal chelating agent. The metal chelating agent means a compound capable of forming a metal ion complex having 2 or more donor atoms in the molecule bonded to a metal ion.

In general, dyes are used in many cases in the form of a metal salt having introduced a dissociable group for the purpose of increasing the solubility in an aqueous solvent. However, the ejection stability deteriorates quickly due to the damage of head by the presence of heavy metals, and the deterioration is particularly conspicuous under a high humidity condition. The deterioration of ejection stability can be prevented by the introduction of a metal chelating agent into an ink composition to thereby trap heavy metals.

Various compounds are known as such a chelating agent.

For example, aliphatic or aromatic carboxylic acid, dicarboxylic acid, tricarboxylic acid and higher polycarboxylic acid, oxycarboxylic acid, ketocarboxylic acid, thiocarboxylic acid, aromatic aldehyde, amine compounds, diamine compounds, polyamine compounds, aminopolycarboxylic acid, nitrilotriacetic acid derivatives, ethylenediamine-polycarboxylic acid, amino acid, heterocyclic carboxylic acid, heterocyclic rings, pyrimidines, nucleosides, purine bases, β-diketones and oxines can be exemplified. Of these compounds, ethylenediaminepolycarboxylic acids and chelating agents in which lone pairs of nitrogen atoms can function as the donor are particularly preferred.

The examples of these compounds are not particularly restricted, and, for example, pyridine-2-carboxylic acid, pyridine-2,3-dicarboxylic acid, pyridine-2,4-dicarboxylic acid, pyridine-2,6-dicarboxylic acid, iminodiacetic acid (IDA), iminodipropionic acid, N-methyliminodiacetic acid, N,N'-ethylenediaminediacetic acid (EDDA), ethylenediamine-tetraacetic acid (EDTA), ethylenediamine-N,N'-diacetic acid-N,N'-dipropionic acid (EDPA), ethylenediaminetetrapropionic acid (EDTP), 1,2-propylenediaminetetraacetic acid (PDTA), trimethylenediaminetetraacetic acid (THTA), tetramethylenediaminetetraacetic acid, pentamethylene-diaminetetraacetic acid, hexamethylenediaminetetraacetic acid, octamethylenediaminetetraacetic acid, 1,2-cyclo-pentanediaminetetraacetic acid, trans-cyclohexane-1,2-diaminetetraacetic acid (CDTA), 1,3,5-triaminocyclohexane-hexaacetic acid (CTHA), ethyl ether diaminetetraacetic acid [2,2-oxybis(ethyliminodiacetic acid)] (E-EDTA), diethylene-triaminepentaacetic acid (DTPA), glycol ether diaminetetra-acetic acid (GEDTA), trimethylenetetraminehexaacetic acid (TTHA), quinoline-2-carboxylic acid, quinoline-8-carboxylic acid, 8-hydroxycinnoline, 1,10-phenanthroline, 2-methyl-1,10-phenanthroline (70), 5-methyl-1,10-phenanthroline, 2,9-dimethyl-1,10-phenanthroline, and 4,7-dimethyl-1,10-phenanthroline are exemplified.

The addition amount of a chelating agent to the ink composition in the invention is from 0.01 to 100 molar times the dye, preferably from 0.05 to 50 molar times, and particularly preferably from 0.1 to 10 molar times.

The ink composition according to the invention can contain other additives, if necessary, in the range not hindering the effect of the invention. As such other additives, well-known additives, e.g., a drying inhibitor (a wetting agent), a discoloration inhibitor, an emulsion stabilizer, a penetration accelerator, an ultraviolet absorber, an antiseptic, a mildewproofing agent, a pH adjustor, a surface tension adjustor, a viscosity adjustor, a dispersant, a dispersion stabilizer, and a rust preventive (refer to JP-A-2003-306623) are exemplified. In the case of a water-soluble ink composition, these various additives are directly added to the ink composition.

Medium:

The ink composition in the invention contains water as a medium. A lipophilic medium may further be added to the ink composition in the invention, and the ink composition can be prepared by the dissolution and/or dispersion of the dye of the invention in the water medium. As the water medium, a mixture obtained by the addition of water-miscible organic solvent can also be used, if necessary. The water-miscible organic solvents disclosed in JP-A-2003-306623 can be used in the invention. It is preferred for the ink composition to contain at least one kind of water-miscible organic solvent. As the water-miscible organic solvents, alcohols and diols are preferred, and isopropanol and 1,2-hexanediol are more preferred. Two or more water-miscible organic solvents may be used in combination.

The manufacturing method of an ink composition is disclosed in JP-A-5-295312, JP-A-7-97541 and JP-A-7-82515, besides the above patent literatures, and these methods can be used in the preparation of the ink composition in the invention.

With shorter wave dye S and longer wave dye L of the invention, other dyes may be used in combination in the ink composition of the invention. When two or more dyes are used in combination, the sum total of the contents of the dyes is preferably from 0.1 to 30 weight parts in 100 weight parts of the ink composition, more preferably from 0.2 to 20 weight parts, and still more preferably from 0.5 to 15 weight parts.

Ink Set:

The ink composition in the invention can be used not only for forming monochromatic images but also for full color image formation. For forming full color images, an ink set using a magenta tone ink composition, a cyan tone ink composition and a yellow tone ink composition in addition to the ink composition of the invention may be used. It is also possible to use ink compositions of light and dark two colors with respective colors. Furthermore, intermediate tone ink compositions, such as blue and orange, can also be used.

As the dyes used in the ink composition in the invention and in ink composition of each color for use in full color image formation, optional dyes can be used. For example, each of the dyes disclosed in JP-A-2003-306623, paragraphs from 0090 to 0092 can be utilized.

Ink Jet Recording Method:

According to the ink jet recording method in the invention, an energy is given to the ink composition and images are formed on well-known image-receiving materials, that is, plain paper, resin coated paper, ink jet paper disclosed, e.g., in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic paper, napkin, glass, metal and ceramics. As the image-receiving materials, image-receiving materials comprising a support having provided thereon an ink-receiving layer containing white inorganic pigment particles are preferred. The ink jet recording methods disclosed in JP-A-2003-306623, paragraphs from 0093 to 0105, can be applied to the invention.

In forming images, a polymer latex compound can be used in combination for the purpose of providing glossiness and water tightness, and improving weather fastness. A latex compound may be added to an image-receiving material any time and anywhere, e.g., before, after, or simultaneously with the addition of colorants, and to image-receiving paper or to ink composition or, alternatively a latex compound may be used as an independent liquid substance. Specifically, the methods disclosed in JP-A-2002-166638, JP-A-2002-121440, JP-A-2002-154201, JP-A-2002-144696, JP-A-2002-080759, Japanese Patent Application Nos. 2002-187342 and 2002-172774 can be preferably used.

Polymer latexes may be added to ink jet recording paper and the constitutional layers of a recording film (including a back coat layer). Polymer latexes are used for the purpose of the improvement of physical properties, such as dimensional stability, curling inhibition, adhesion prevention and cracking prevention of a film. Polymer latexes are disclosed in JP-A-62-245258, JP-A-62-1316648 and JP-A-62-110066. Cracking of a layer and curling can be prevented by the addition of polymer latexes having a low glass transition temperature (40° C. or less) to the layer containing a mordant. Further, curling can be prevented by the addition of polymer latexes having a high glass transition temperature to a back coat layer.

The ink composition in the invention is used irrespective of ink jet recording system. That is, the ink composition in the invention is used in well-known recording systems, e.g., a charge control system of ejecting an ink composition by utilizing electrostatic induction force, a drop on demand system (a pressure pulse system) utilizing vibratory pressure of piezo elements, an acoustic ink jet system of converting electric signal to acoustic beam to irradiate ink and ejecting ink by utilizing radiation pressure, and a thermal ink jet system of heating an ink composition to form foams and utilizing the formed pressure.

Ink jet recording system includes a system of ejecting a great number of ink droplets minute in volume of an ink composition low in density called photo-ink, a system of improving image quality with a plurality of ink compositions having substantially the same hue and different densities, and a system of using colorless and transparent ink.

EXAMPLE

The invention is described with referring to the examples, but the invention is not limited thereto.

Example 1

Preparation of Ink Composition

The components of ink composition shown in Table 1 below were stirred and dissolved with heating at 30 to 40° C. for one hour. Subsequently, the composition was filtered through a micro filter having an average pore diameter of 0.25 µm under reduced pressure, whereby each ink composition was obtained.

TABLE 1

| Ink Composition | | Bk-01 Invention | Bk-02 Invention | Bk-03 Invention | Bk-04 Invention | Bk-05 Invention | Bk-06 Comparison |
|---|---|---|---|---|---|---|---|
| Dye | BL-1 | 60.0 | 60.0 | 60.0 | 60.0 | 60.0 | 60.0 |
| | BS-1 | 15.0 | 15.0 | 15.0 | 15.0 | — | 15.0 |
| | BS-2 | — | — | — | — | 15.0 | — |
| Water-miscible organic solvent | Glycerol | 100 | 100 | 100 | 100 | 100 | 100 |
| | Triethylene glycol | 25 | 25 | 25 | 25 | 25 | 25 |
| | Triethylene glycol monobutyl ether | 80 | 80 | 80 | 80 | 80 | 80 |
| | 1,2-Hexanediol | 35 | 35 | 35 | 35 | 35 | 35 |
| | 2-Pyrrolidone | 35 | 35 | 35 | 35 | 35 | 35 |
| pH Adjustor | Triethanolamine | 4 | 4 | 4 | 4 | 4 | 4 |
| Dissolution aid | Urea | 45 | 45 | 45 | 45 | 45 | 45 |
| Surfactant | Olfine E1010 | 6.0 | 6.0 | 6.0 | 6.0 | 6.0 | 6.0 |
| Bronzing inhibitor | Compound A | 20.0 | — | — | 20.0 | 20.0 | — |
| | Compound B | — | 20.0 | — | — | — | — |
| Ozone resisting improver | Compound C | — | — | 30.0 | 30.0 | 30.0 | — |
| Chelating agent | Tetrasodium EDTA | 5.0 | 5.0 | 5.0 | 5.0 | 5.0 | 5.0 |
| Antiseptic | PROXEL XLII | 5.0 | 5.0 | 5.0 | 5.0 | 5.0 | 5.0 |
| | Benzotriazole | 0.08 | 0.08 | 0.08 | 0.08 | 0.08 | 0.08 |

Hyper-pure water (resisting value: 18 MΩ × cm or higher) to make 1 liter Unit: g/liter

BL-1

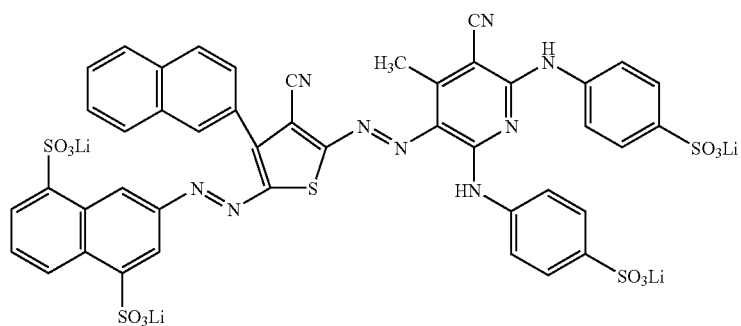

BS-1

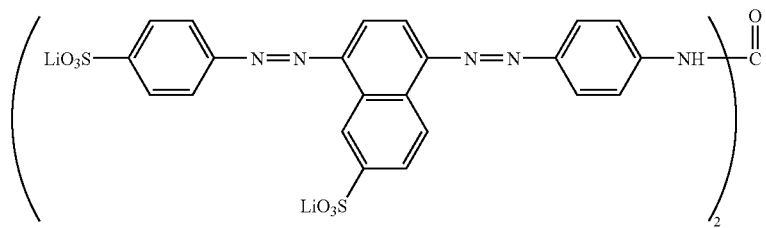

BS-2

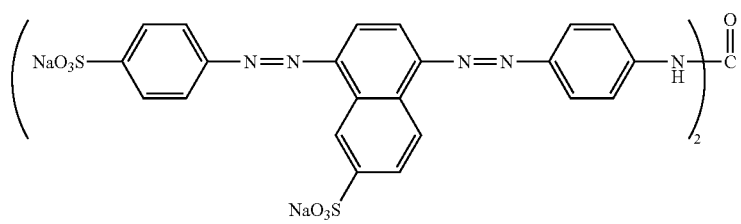

Compound A

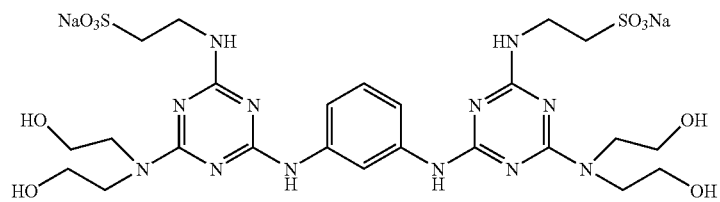

TABLE 1-continued

| Ink Composition | Bk-01 Invention | Bk-02 Invention | Bk-03 Invention | Bk-04 Invention | Bk-05 Invention | Bk-06 Comparison |
|---|---|---|---|---|---|---|
| 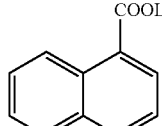 Compound B | | | | | | |
| 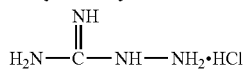 Compound C | | | | | | |

Ink Jet Recording:

The above black ink composition was filled in a black ink cartridge of ink jet printer PM970C manufactured by Epson Corporation, and genuine cartridges were used as other ink compositions and printing was performed with the printer.

Evaluation of Image Quality:

Images of a black line in solid yellow, magenta and cyan colors were printed on ink jet paper, photo glossy paper "Kassai", manufactured by Fuji Photo Film Co., Ltd. at 30° C. 80% RH. After allowing the image to stand overnight on the same condition, the boundaries between black and each color of yellow, magenta and cyan were visually observed, but an image defect such as bleeding between colors was not observed.

The same experiment was performed with photographic paper manufactured by Seiko Epson Corporation and ink jet paper PR101 manufactured by Canon Inc. An image defect such as bleeding between colors was not observed.

Evaluations were performed as follows. The results obtained are shown in Tables 2 and 3 below.

Evaluation of Bronzing Resistance:

A black solid image was printed on ink jet paper, photo glossy paper "Kassai" manufactured by Fuji Photo Film Co., Ltd. at 30° C. 80% RH. After allowing the image to stand overnight on the same condition, a bronzing phenomenon (metallic luster on the surface of a print) was visually evaluated by the following criteria.

A: Bronzing luster is not observed at all.
B: Bronzing luster is observed although a little.
C: Bronzing luster is clearly observed.

Evaluation of Ozone Resistance:

A gray stepwise patch image was printed on ink jet paper, photo glossy paper "Kassai", manufactured by Fuji Photo Film Co., Ltd. with black ink. Twenty-four hours after the printing of the stepwise patch image, the reflection density (Ci) of each density region of the stepwise patch part was measured with X-rite 310 densitometer having a status A filter on board as standard. The sample was subjected to discoloration test by preserving in an ozone gas discoloration tester capable of adjusting ozone gas density to 5 mg/liter at all times. As the ozonizer, a commercially available high tension discharge type apparatus of application of 5 kV AC voltage was used, and the ozone gas density was set and controlled with an ozone gas monitor (model: OZG-EM-01, manufactured by APPLICS CO., LTD.).

After preservation of the sample for one week, image density was measured again to find the density after preservation (Cf). Ozone resistance was evaluated by finding the residual ratio (%) of the coloring matter by Cf/Ci×100. The value of Ci at 0.9 to 1.1 was adopted as the residual ratio of the coloring matter.

TABLE 2

| Ink | Evaluation of Bronzing Resistance |
|---|---|
| Bk-01 (Invention) | A |
| Bk-02 (Invention) | A |
| Bk-04 (Invention) | A |
| Bk-05 (Invention) | A |
| Bk-06 (Comparison) | B |

TABLE 3

| Ink | Ozone Resistance, Residual Rate of Coloring Matter (%) |
|---|---|
| Bk-03 (Invention) | 89 |
| Bk-04 (Invention) | 89 |
| Bk-05 (Invention) | 88 |
| Bk-06 (Comparison) | 78 |

The same experiment was performed with photographic paper manufactured by Seiko Epson Corporation and ink jet paper PR101 manufactured by Canon Inc. The same results as above were obtained.

Example 2

Preparation of Ink Composition

Each ink composition was prepared in the same manner as in Example 1 with the composition shown in Table 4 below.

TABLE 4

| Ink Composition | | Bk-07 Invention | Bk-08 Invention | Bk-09 Invention | Bk-10 Invention | Bk-11 Invention | Bk-12 Comparison |
|---|---|---|---|---|---|---|---|
| Dye | BL-1 | 60.0 | 60.0 | 60.0 | 60.0 | 60.0 | 60.0 |
| | BS-1 | 15.0 | 15.0 | 15.0 | 15.0 | — | 15.0 |
| | BS-2 | — | — | — | — | 15.0 | — |
| Water-miscible | Glycerol | 90 | 90 | 90 | 90 | 90 | 90 |

TABLE 4-continued

| Ink Composition | | Bk-07 Invention | Bk-08 Invention | Bk-09 Invention | Bk-10 Invention | Bk-11 Invention | Bk-12 Comparison |
|---|---|---|---|---|---|---|---|
| organic solvent | Ethylene glycol | 110 | 110 | 110 | 110 | 110 | 110 |
| | Isopropanol | 30 | 30 | 30 | 30 | 30 | 30 |
| pH Adjustor | Triethanolamine | 4 | 4 | 4 | 4 | 4 | 4 |
| Dissolution aid | Urea | 110 | 110 | 110 | 110 | 110 | 110 |
| Surfactant | Olfine E1010 | 6.0 | 6.0 | 6.0 | 6.0 | 6.0 | 6.0 |
| Bronzing inhibitor | Compound A | 20.0 | — | — | 20.0 | 20.0 | — |
| | Compound B | — | 20.0 | — | — | — | — |
| Ozone resisting improver | Compound C | — | — | 30.0 | 30.0 | 30.0 | — |
| Chelating agent | Tetrasodium EDTA | 5.0 | 5.0 | 5.0 | 5.0 | 5.0 | 5.0 |
| Antiseptic | PROXEL XLII | 5.0 | 5.0 | 5.0 | 5.0 | 5.0 | 5.0 |
| | Benzotriazole | 0.08 | 0.08 | 0.08 | 0.08 | 0.08 | 0.08 |

Hyper-pure water(resisting value: 18 MΩ · cm or higher) to make 1 liter
Unit: g/liter Ink Jet Recording:

The above black ink was filled in a black ink cartridge of ink jet printer Pixus 990i manufactured by Canon Inc., and genuine cartridges were used as other ink compositions and printing was performed with the printer. The evaluations were performed in the same manner as in Example 1.

Evaluation of Image Quality:

Image quality was evaluated in the same manner as in Example 1, but an image defect such as bleeding between colors was not observed. The same experiment was performed with photographic paper manufactured by Seiko Epson Corporation and ink jet paper PR101 manufactured by Canon Inc. An image defect such as bleeding between colors was not observed.

Evaluation of Bronzing Resistance:

The results obtained are shown in Table 5 below. Also the same results could be obtained when photographic paper manufactured by Seiko Epson Corporation and PR101 manufactured by Canon Inc. were used.

Evaluation of Ozone Resistance:

The results obtained are shown in Table 6 below. Also the same results could be obtained when photographic paper manufactured by Seiko Epson Corporation and PR101 manufactured by Canon Inc. were used.

TABLE 5

| Ink | Evaluation of Bronzing Resistance |
|---|---|
| Bk-07 (Invention) | A |
| Bk-08 (Invention) | A |
| Bk-10 (Invention) | A |
| Bk-11 (Invention) | A |
| Bk-12 (Comparison) | B |

TABLE 3

| Ink | Ozone Resistance, Residual Rate of Coloring Matter (%) |
|---|---|
| Bk-09 (Invention) | 91 |
| Bk-10 (Invention) | 91 |
| Bk-11 (Invention) | 90 |
| Bk-12 (Comparison) | 80 |

From the results in Examples 1 and 2, it is understood that the obtained images are excellent in bronzing resistance and ozone resistance when the ink compositions in the invention are used.

It is also seen that the ink performance synthetically heightens by the combination of additives.

The present invention has been explained in detail and by referring to specific embodiments, but it will be apparent for those skilled in the art that various modification and alterations can be added within the scope and spirit of the invention.

The entire disclosure of each and every foreign patent application from which the benefit of foreign priority has been claimed in the present application is incorporated herein by reference, as if fully set forth herein.

INDUSTRIAL APPLICABILITY

A black ink composition of the present invention is useful for an ink jet recording capable of high density recording free from the occurrence of the bronzing phenomenon and capable of forming an image having high fastness to light and ozone, and having sufficient moisture proof not causing bleeding even when preserved under high humidity conditions.

The invention claimed is:

1. A black ink composition comprising:
   at least two coloring materials comprising a first coloring material having an absorption maximum at a shorter wavelength;
   water; and
   an additive,
   wherein the first coloring material is a water-soluble dye comprising: 3 or more azo groups in one molecule thereof; and a naphthalene skeleton, and
   the additive is at least one of a bronzing inhibitor and an ozone resisting improver.

2. The black ink composition as claimed in claim 1, wherein the bronzing inhibitor is a colorless water-soluble planar compound having more than 10 delocalized π electrons in one molecule thereof.

3. The black ink composition as claimed in claim 2, wherein the colorless water-soluble planar compound is a compound having at least two aromatic rings.

4. The black ink composition as claimed in claim 1, wherein the bronzing inhibitor is at least one of an aromatic compound having a carboxyl group and a salt of the aromatic compound.

5. The black ink composition as claimed in claim 4, wherein the aromatic compound is a compound having a naphthalene skeleton.

6. The black ink composition as claimed in claim 1, wherein the ozone resisting improver is a guanidine compound.

7. The black ink composition as claimed in claim 6, wherein the guanidine compound is a compound represented by formula (I):

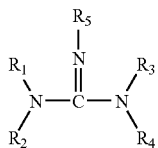

wherein $R_1$, $R_2$, $R_3$ and $R_4$ each independently represents a hydrogen atom, an alkyl group, an alkoxyl group, an aryl group, a heterocyclic group, or an amino group; $R_5$ represents a hydrogen atom, an alkyl group, an alkoxyl group, an aryl group, or a heterocyclic group; and the alkyl group, alkoxyl group, aryl group, heterocyclic group, and amino group each may be substituted.

8. The black ink composition as claimed in claim 1, wherein the first coloring material has an absorption maximum at a wavelength of from 440 to 540 nm and a half-band width of from 90 to 200 nm in an aqueous solvent.

9. The black ink composition as claimed in claim 1, wherein the at least two coloring materials comprises a second coloring material having an absorption maximum at a longer wavelength than 550 nm.

10. An ink set comprising a black ink composition as claimed in claim 1.

11. A recording method comprising:
providing a black ink composition as claimed in claim 1 and an image-receiving material; and
providing an energy to the ink composition to form and record an image on the image-receiving material.

12. The recording method as claimed in claim 11 which is for ink jet recording.

* * * * *